United States Patent
Kim et al.

(10) Patent No.: US 11,596,010 B2
(45) Date of Patent: Feb. 28, 2023

(54) METHOD FOR TRANSMITTING AND RECEIVING DATA IN WIRELESS COMMUNICATION SYSTEM AND TERMINAL THEREFOR

(71) Applicant: LG ELECTRONICS INC., Seoul (KR)

(72) Inventors: Heejin Kim, Seoul (KR); Hanbyul Seo, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 17/252,227

(22) PCT Filed: Jun. 12, 2019

(86) PCT No.: PCT/KR2019/007056
§ 371 (c)(1),
(2) Date: Dec. 14, 2020

(87) PCT Pub. No.: WO2019/240483
PCT Pub. Date: Dec. 19, 2019

(65) Prior Publication Data
US 2021/0266992 A1    Aug. 26, 2021

(30) Foreign Application Priority Data

Jun. 12, 2018  (KR) .................... 10-2018-0067189

(51) Int. Cl.
*H04W 76/10* (2018.01)
*H04W 4/46* (2018.01)
(Continued)

(52) U.S. Cl.
CPC .............. *H04W 76/14* (2018.02); *H04W 4/24* (2013.01); *H04W 4/46* (2018.02); *H04W 92/18* (2013.01)

(58) Field of Classification Search
USPC ......................................................... 370/329
See application file for complete search history.

(56) References Cited

U.S. PATENT DOCUMENTS

2016/0044694 A1 *  2/2016  Park ...................... H04W 72/10
                                                       370/329
2016/0073335 A1 *  3/2016  Liao ...................... H04W 36/08
                                                       370/329
(Continued)

FOREIGN PATENT DOCUMENTS

KR     20170028883       3/2017
KR     20170029005       3/2017
(Continued)

OTHER PUBLICATIONS

NPL document 3GPP TS 24.344, V15.1.0., Proximity-services (ProSe) User Equipment (UE) to ProSe function protocol aspects, Stage 3, release 15, dated "Dec. 2017" (Year: 2017).*
(Continued)

*Primary Examiner* — Gregory B Sefcheck
*Assistant Examiner* — Majid Esmaeilian
(74) *Attorney, Agent, or Firm* — Lee Hong Degerman Kang Waimey

(57) ABSTRACT

Disclosed is a method in which a first terminal receives data in a wireless communication system. Specifically, the method may include transmitting a first message that includes a sidelink communication request and receiving sidelink communication data from a second terminal. In particular, the first terminal may be a subscriber of a first Public Land Mobile Network (PLMN), and the second terminal may be a subscriber of a second PLMN different from the first PLMN. In addition, the sidelink communication data may be received by using a carrier of the first PLMN. The first terminal is capable of communicating with at least one of another UE, a UE related to an autonomous driving vehicle, a base station or a network.

15 Claims, 25 Drawing Sheets

(a)

(b)

(51) Int. Cl.
  *H04W 4/24*   (2018.01)
  *H04W 76/14*  (2018.01)
  *H04W 92/18*  (2009.01)

(56) References Cited

U.S. PATENT DOCUMENTS

| | | | | |
|---|---|---|---|---|
| 2016/0119964 | A1* | 4/2016 | Cho | H04W 48/16 |
| | | | | 370/329 |
| 2016/0192420 | A1* | 6/2016 | Kim | H04W 4/06 |
| | | | | 370/329 |
| 2017/0353609 | A1* | 12/2017 | Huang | H04M 15/46 |
| 2017/0353851 | A1* | 12/2017 | Gonzalez | H04W 60/00 |
| 2018/0027538 | A1* | 1/2018 | Uchiyama | H04W 72/0406 |
| | | | | 370/329 |
| 2018/0103460 | A1* | 4/2018 | Sharma | H04W 72/042 |
| 2018/0332585 | A1* | 11/2018 | Faurie | H04W 4/70 |

FOREIGN PATENT DOCUMENTS

| | | |
|---|---|---|
| KR | 20180037678 | 4/2018 |
| WO | 2016060482 | 4/2016 |

OTHER PUBLICATIONS

PCT International Application No. PCT/KR2019/007056, International Search Report dated Oct. 4, 2019, 4 pages.
Ericsson, "Inter-PLMN Operations for Sidelink," 3GPP TSG-RAN WG2 #94, R2-164109, May 2016, 4 pages.

* cited by examiner

FIG. 5
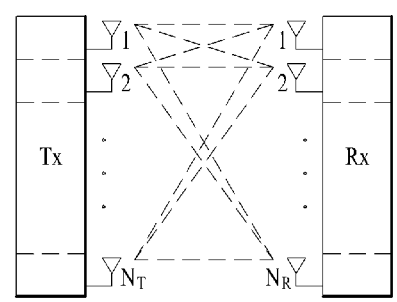
(a)
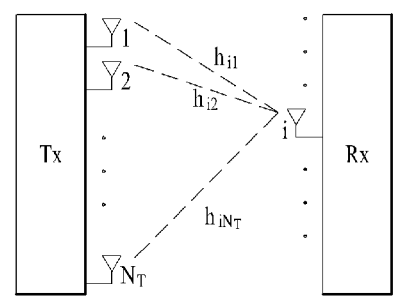
(b)

FIG. 8
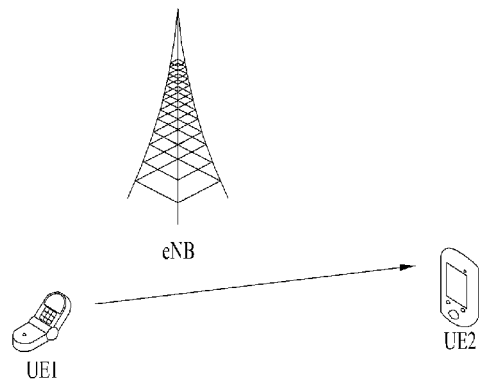
(a)
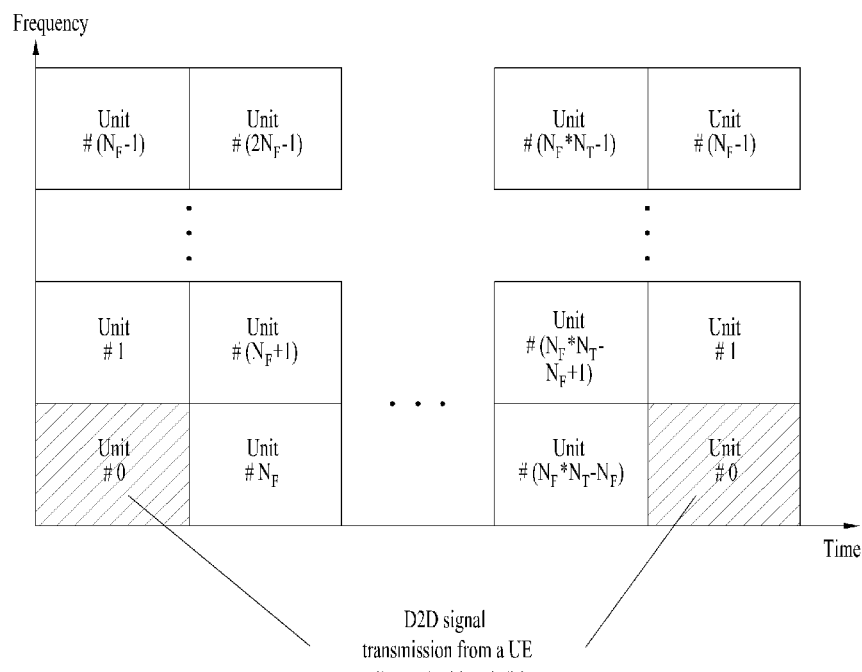
(b)

FIG. 9
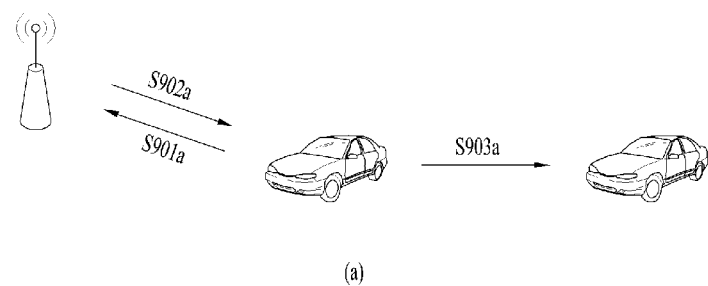
(a)
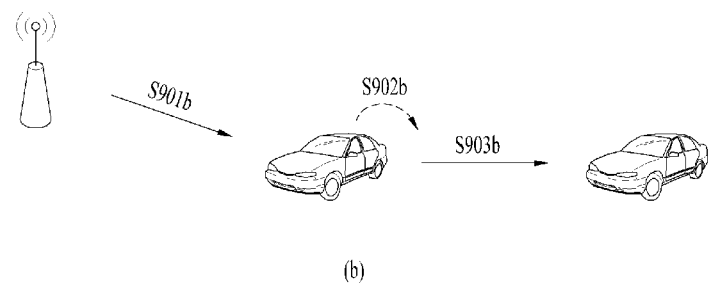
(b)

FIG. 12
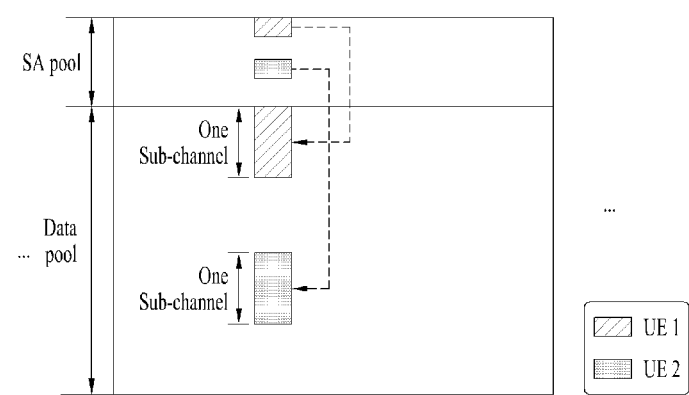
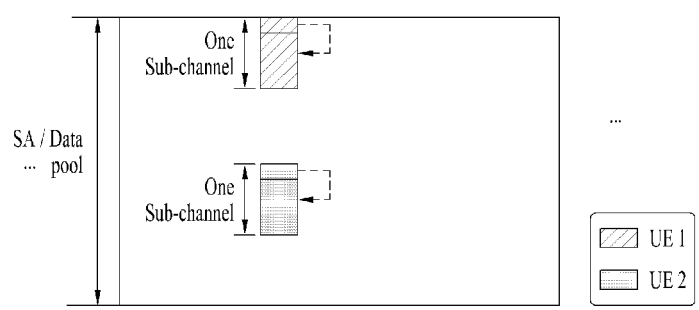

FIG. 14
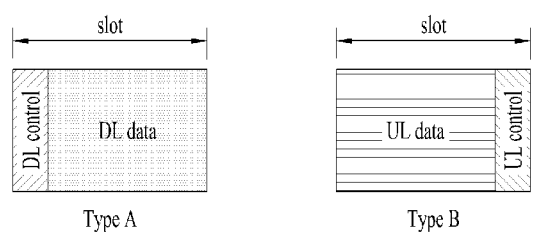
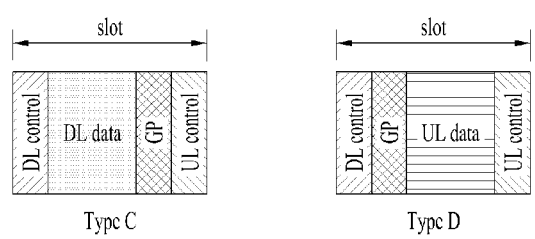

METHOD FOR TRANSMITTING AND RECEIVING DATA IN WIRELESS COMMUNICATION SYSTEM AND TERMINAL THEREFOR

CROSS-REFERENCE TO RELATED APPLICATIONS

This application is the National Stage filing under 35 U.S.C. 371 of International Application No. PCT/KR2019/007056, filed on Jun. 12, 2019, which claims the benefit of earlier filing date and right of priority to Korean Application No. 10-2018-0067189, filed on Jun. 12, 2018, the contents of which are all incorporated by reference herein in their entirety.

TECHNICAL FIELD

The present disclosure relates to a method of transmitting and receiving data in a wireless communication system supporting sidelink, and a user equipment (UE) therefor, and more particularly, to a method of conducting direct communication between UEs belonging to different public land mobile networks (PLMNs).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

In conjunction with D2D communication, vehicle-to-everything (V2X) is under discussion. V2X conceptually covers (i) vehicle-to-vehicle (V2V) communication, (ii) vehicle-to-pedestrian (V2P) communication between a vehicle and a terminal carried by an individual (a pedestrian, a bike rider, a car driver, or a passenger), and (iii) vehicle-to-infrastructure (V2I) communication between a vehicle and a roadside unit (RSU).

DISCLOSURE

Technical Problem

An aspect of the present disclosure is to provide a method of receiving data from a second user equipment (UE) by a first UE in a wireless communication system and a method of transmitting data to a first UE by a second UE. Particularly, an aspect of the present disclosure is to provide a method of transmitting and receiving data between a first UE and a second UE which belong to different public land mobile networks (PLMNs).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving data by a first user equipment (UE) in a wireless communication system includes transmitting a first message including a sidelink communication request, and receiving sidelink communication data from a second UE. The first UE is a subscriber of a first public land mobile network (PLMN), and the second UE is a subscriber of a second PLMN different from the first PLMN. The sidelink communication data is received in a carrier of the first PLMN.

The first message may include i) information indicating that even a UE subscribed to a PLMN other than the first PLMN is allowed to transmit data in a carrier of the first PLMN, and ii) information indicating that the UE is not charged for the data transmission in the carrier of the first PLMN.

The first message may be transmitted in one of a carrier of the first PLMN, a carrier of the second PLMN, or a dedicated carrier for transmission of the first message.

The method may further include receiving, from the second UE, a second message indicating that the sidelink communication request has been accepted in response to the first message, and transmitting, to the second UE, a third message indicating that a sidelink has been established in response to the second message. Particularly, the sidelink communication data may be received on the sidelink.

The sidelink communication data may be for a non-public safety (PS)-related service.

The method may further include reporting information related to use of reception resources of the sidelink communication data to the first PLMN.

The first UE may implement at least one advanced driver assistance system (ADAS) function based on a signal controlling movement of the first UE.

In an aspect of the present disclosure, a method of transmitting data by a second UE in a wireless communication system includes receiving, from a first UE, a first message including a sidelink communication request, and transmitting sidelink communication data to the first UE. The first UE is a subscriber of a first PLMN, and the second UE is a subscriber of a second PLMN different from the first PLMN. The sidelink communication data is transmitted in a carrier of the first PLMN.

When the first message is configured to be received in a carrier of the first PLMN, the second UE may be preconfigured to periodically monitor the carrier of the first PLMN.

When a specific condition is satisfied, the second UE may transmit the sidelink communication data. Particularly, when the second UE is capable of transmitting the sidelink communication data to the first UE, while satisfying specific quality of service (QoS), the specific condition may be satisfied.

The method may further include reporting information related to use of transmission resources of the sidelink communication data to the first PLMN.

Advantageous Effects

According to the examples or implementation examples of the present disclosure, direct communication may be efficiently conducted between user equipments (UEs) belonging to different public land mobile networks (PLMNs), and a charging mechanism may be clearly defined between the UEs.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 5 is a diagram illustrating the configuration of a wireless communication system having multiple antennas.

FIG. 8 is a diagram illustrating an exemplary D2D resource pool for D2D communication.

FIG. 9 is a diagram referred to for describing transmission modes and scheduling schemes for vehicle-to-everything (V2X).

FIG. 12 is a diagram referred to for describing an SA and data transmission in V2X.

FIG. 13 and FIG. 14 are diagrams illustrating an exemplary frame structure in new radio access technology (NR or New RAT).

BEST MODE

Figure 1:
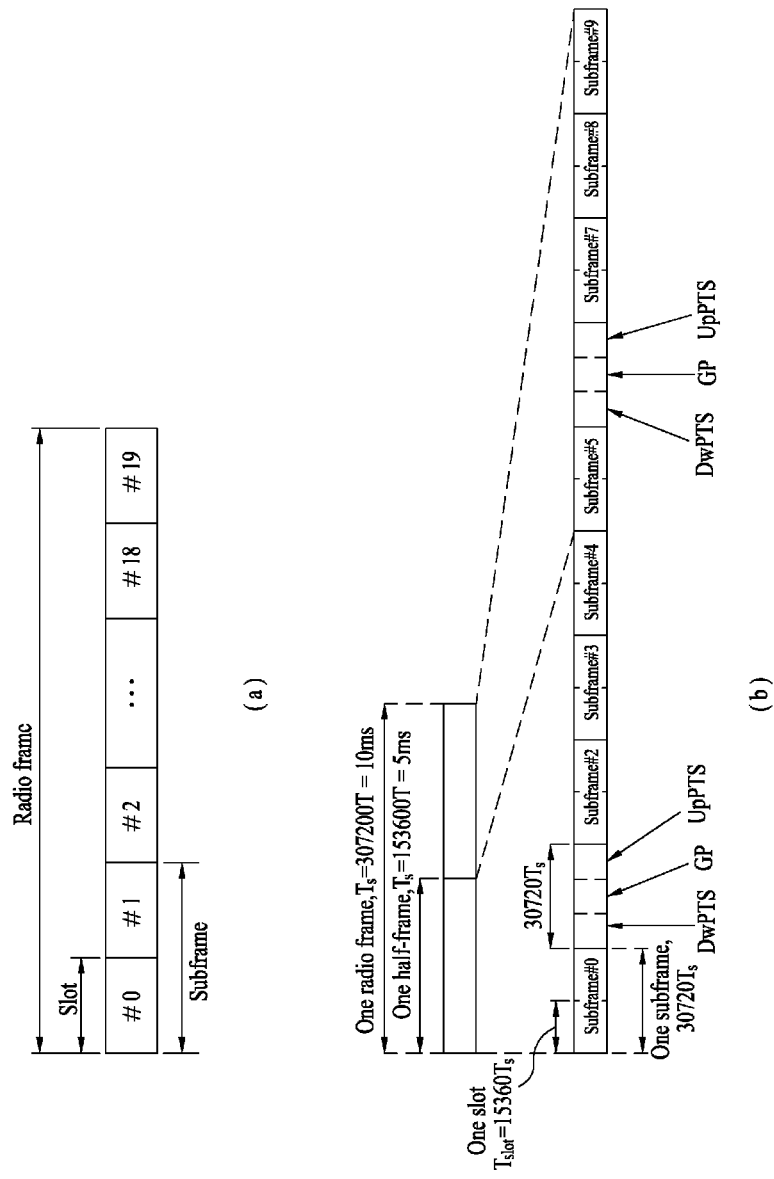
FIG. 1 is a diagram illustrating the structure of a radio frame.

The examples or implementation examples of the present disclosure described hereinbelow are combinations of elements and features of the present disclosure. The elements or features may be considered selective unless otherwise mentioned. Each element or feature may be practiced without being combined with other elements or features. Further, an example or implementation example of the present disclosure may be constructed by combining parts of the elements and/or features. Operation orders described in examples or implementation examples of the present disclosure may be rearranged. Some constructions or features of any one example or implementation example may be included in another example or implementation example and may be replaced with corresponding constructions or features of another example or implementation example.

In the examples or implementation examples of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'gNodeB (gNB; next generation NodeB)' 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc. The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the examples or implementation examples of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The examples or implementation examples of the present disclosure may be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure may be supported by those documents. Further, all terms as set forth herein may be explained by the standard documents.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink (DL) and SC-FDMA for uplink (UL). LTE-A is an evolution of 3GPP LTE. WiMAX may be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, UL and/or DL data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A DL radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for DL, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical DL control channel (PDCCH) and the other OFDM symbols may be allocated to a physical DL shared channel (PDSCH).

FIG. 1(b) illustrates the type-2 radio frame structure. A type-2 radio frame includes two half frames, each having 5 subframes, a DL pilot time slot (DwPTS), a guard period (GP), and an UL pilot time slot (UpPTS). Each subframe is divided into two slots. The DwPTS is used for initial cell search, synchronization, or channel estimation at a UE. The UpPTS is used for channel estimation and acquisition of UL transmission synchronization to a UE at an eNB. The GP is a period between an UL and a DL, which eliminates UL interference caused by multipath delay of a DL signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
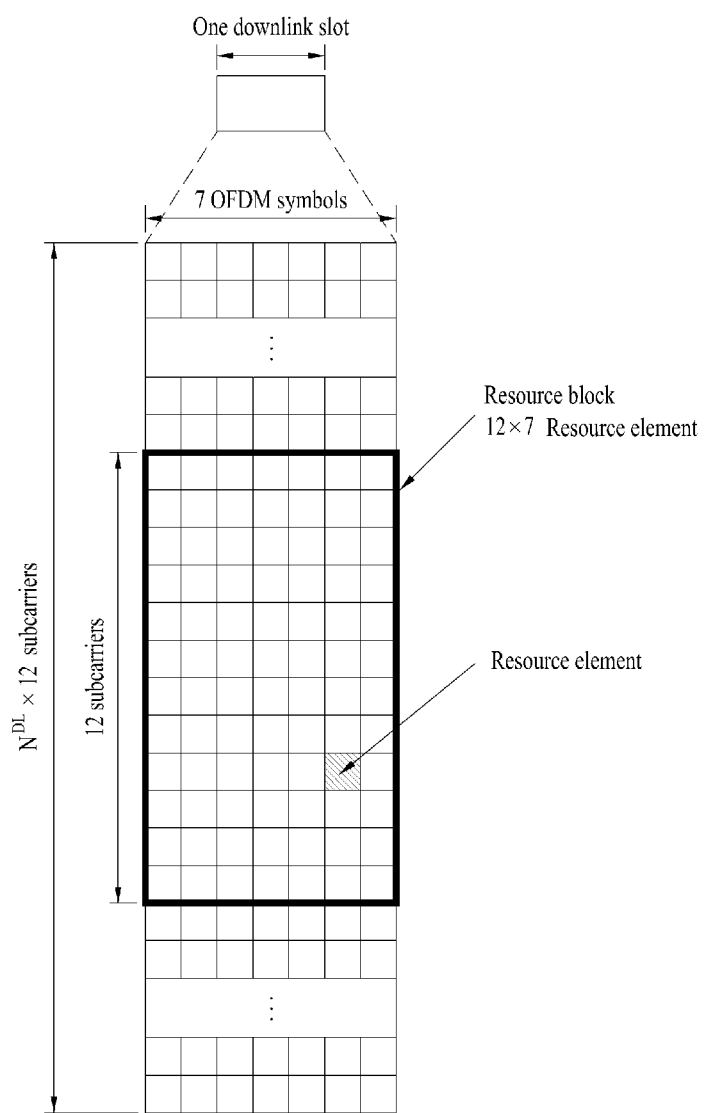
FIG. 2 is a diagram illustrating a resource grid during the duration of one downlink (DL) slot.

FIG. 2 illustrates the structure of a DL resource grid for the duration of one DL slot. A DL slot includes 7 OFDM symbols in the time domain and an RB includes 12 subcarriers in the frequency domain, which does not limit the scope and spirit of the present disclosure. For example, a DL slot may include 7 OFDM symbols in the case of the normal CP, whereas a DL slot may include 6 OFDM symbols in the case of the extended CP. Each element of the resource grid is referred to as a resource element (RE). An RB includes 12×7 REs. The number of RBs in a DL slot, NDL depends on a DL transmission bandwidth. An UL slot may have the same structure as a DL slot.

Figure 3:
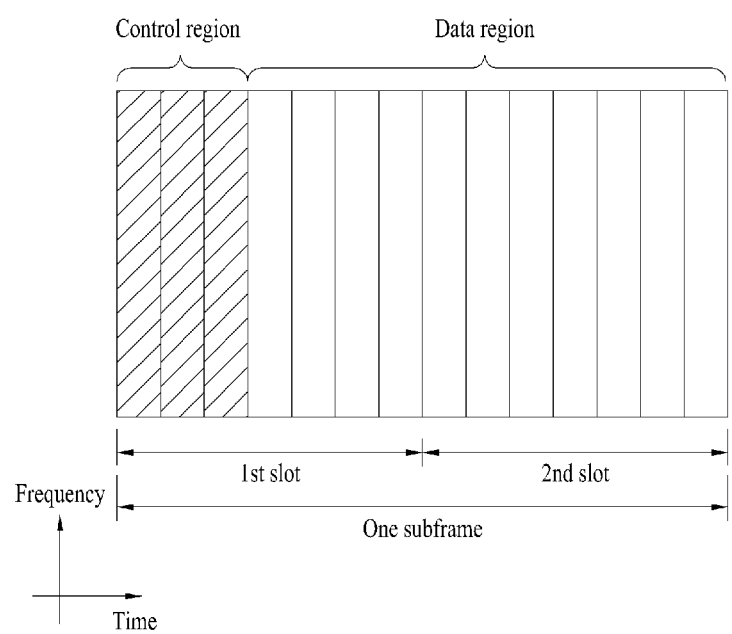
FIG. 3 is a diagram illustrating the structure of a DL subframe.

FIG. 3 illustrates the structure of a DL subframe. Up to three OFDM symbols at the start of the first slot in a DL subframe are used for a control region to which control channels are allocated and the other OFDM symbols of the DL subframe are used for a data region to which a PDSCH is allocated. Downlink control channels used in the 3GPP LTE system include a physical control format indicator channel (PCFICH), a physical DL control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an UL transmission. Control information carried on the PDCCH is called DL control information (DCI). The DCI transports UL or DL scheduling information, or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
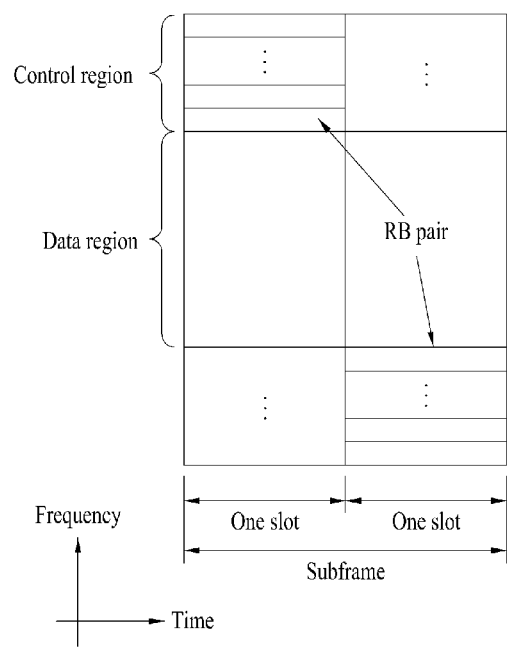
FIG. 4 is a diagram illustrating the structure of an uplink (UL) subframe.

FIG. 4 illustrates the structure of an UL subframe. An UL subframe may be divided into a control region and a data region in the frequency domain. A physical UL control channel (PUCCH) carrying UL control information is allocated to the control region and a physical UL shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In diagram of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into DL RSs and UL RSs. In the current LTE system, the UL RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an UL channel in a different frequency.

The DL RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when DL DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires DL channel information, the former should be transmitted in a broad band and received even by a UE that does not receive DL data in a specific subframe. This RS is also used in a situation like handover. The latter is an RS that an eNB transmits along with DL data in specific resources. A UE may demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system may be obtained.

In order to explain a communicating method in an MIMO system in detail, mathematical modeling may be represented as follows. It is assumed that there are $N_T$ Tx antennas and $N_R$ Rx antennas.

Regarding a transmitted signal, if there are $N_T$ Tx antennas, the maximum number of pieces of information that may be transmitted is $N_T$. Hence, the transmission information may be represented as shown in Equation 2.

$$s = [s_1, s_2, \ldots, s_{N_T}] \qquad \text{[Equation 2]}$$

Meanwhile, transmit powers may be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers may be represented as Equation 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

In addition, S may be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector Ŝ having the adjusted transmit powers, the weight matrix W serves to appropriately distribute the transmission information to each $$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

antenna according to a transport channel state. $x_1, x_2, \ldots, x_{N_T}$ may be expressed by using the vector X as follows.

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas may be expressed as follows.

$$y=[y_1,y_2,\ldots,y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in diagram of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i may be expressed as follows.

$$h_i^T=[h_{i1},h_{i2},\ldots,h_{iN_T}] \quad \text{[Equation 7]}$$

Accordingly, all channels from the $N_T$ Tx antennas to the $N_R$ Rx antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix R The AWGN $n_1, n_2, \ldots, n_{N_R}$ respectively added to the $N_R$ Rx antennas may be expressed as follows.

$$n=[n_1,n_2,\ldots,n_{N_R}]^T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix may also be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix may be the maximum number of channels through which different pieces of information may be transmitted.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
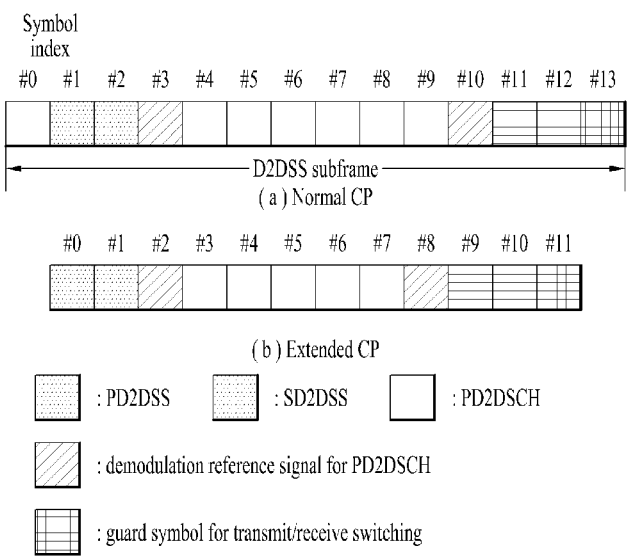
FIG. 6 is a diagram illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-Chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/ repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS may be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
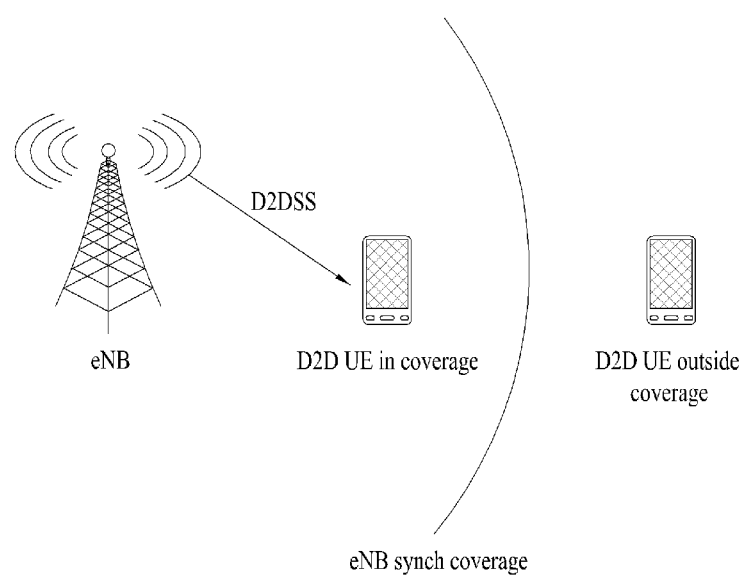
FIG. 7 is a diagram illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB may inform UE1 of the resource pool. If UE1 is located at the outside of coverage of the eNB, the resource pool may be informed by a different UE or may be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool may be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool may be classified into various types. First of all, the resource pool may be classified according to contents of a D2D signal transmitted via each resource pool. For example, the contents of the D2D signal may be classified into various signals and a separate resource pool may be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with D2D data. In this case, an SA resource pool may correspond to a pool of resources that an SA and D2D data are transmitted in a manner of being multiplexed. The SA signal may also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information may be transmitted only in a resource pool for the D2D data channel. In other word, REs, which are used to transmit SA information in a specific resource unit of an SA resource pool, may also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal may be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

Figure 10:
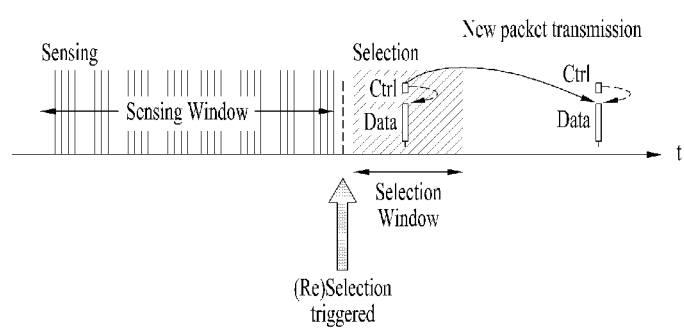
FIG. 10 is a diagram illustrating a method of selecting resources in V2X.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each medium access control (MAC) protocol data unit (PDU) is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

Figure 11:
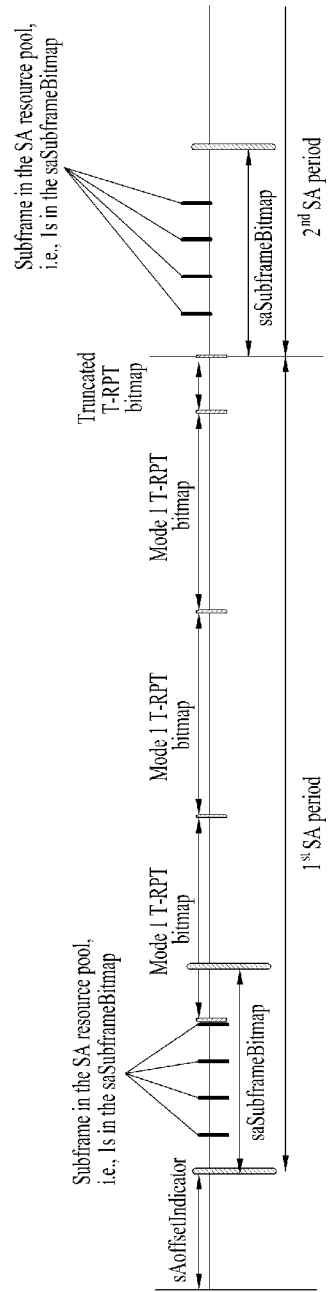
FIG. 11 is a diagram referred to for describing a scheduling assignment (SA) and data transmission in D2D.

In sidelink transmission mode 1 or 2, an SA period may be defined as illustrated in FIG. 11. Referring to FIG. 11, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Unlike D2D, an SA (PSCCH) and data (PSSCH) are transmitted in FDM in V2X, that is, sidelink transmission mode 3 or 4. Because latency reduction is a significant factor in V2X in diagram of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
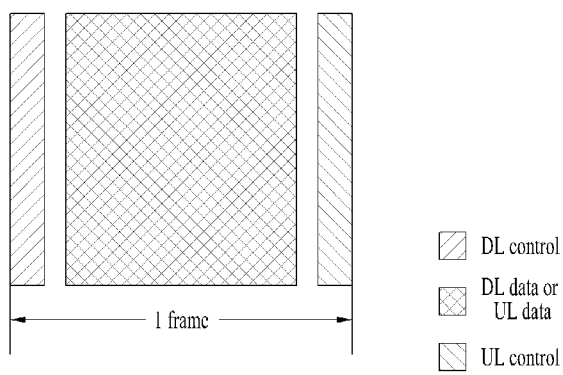

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI, (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Even in D2D communication, carrier aggregation (CA) may be used to increase a data transmission rate or reliability. For example, a receiving UE may receive signals in aggregated carriers and combine or jointly decode the received signals or transmit decoded signals to a higher layer to perform (soft) combining on the signals transmitted in the different carriers. However, because the receiving UE needs to identify the aggregated carriers, that is, signals of carriers to be combined in order to perform this operation, radio resources of the aggregated carriers need to be indicated. In legacy 3GPP Rel.14 V2X, a transmitting UE directly indicates time and frequency positions at which data (e.g., a PSSCH) is transmitted, by a control signal (e.g., a PSCCH). When CA is indicated by the PSCCH, this indication requires an additional bit field. However, the number of reserved bits currently available for the PSCCH is small, about 5 to 7. Accordingly, there is a need for a method of effectively indicating radio resources of aggregated carriers.

Inter-PLMN Operation for Supporting Unicast Over Licensed Band PC5

Sidelink (SL) communication is a communication mode in which UEs may directly communicate with each other over a PC5 interface. This communication mode is supported when the UE is served by the E-UTRAN and when the UE is outside of E-UTRA coverage. For synchronization for an out-of-coverage operation, UE(s) may operate as a synchronization source by transmitting a physical sidelink broadcast channel (PSBCH) and a synchronization signal.

In general, a public land mobile network (PLMN) refers to a combination of wireless communication services provided by a specific operator in a specific country. The PLMN may be implemented with some cellular technologies such as GSM/2G, UMTS/3G, or LTE/4G. A PLMN may be provided by a single operator in a specific country and also referred to as a cellular network.

Figure 15:
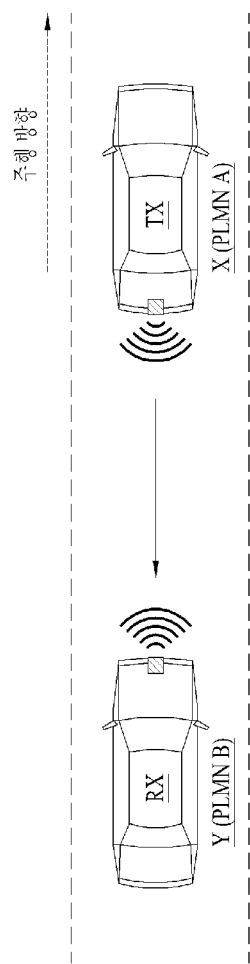
FIG. 15 is a diagram illustrating a data-receiving user equipment (UE) and a data-transmitting UE which belong to different public land mobile networks (PLMNs) according to an example or implementation example of the present disclosure.

According to an example or implementation example of the present disclosure, a method of configuring an inter-PLMN direct communication link between UEs belonging to different PLMNs. FIG. 15 illustrates a UE (TxUE) transmitting data related to service provisioning and a UE (RxUE) receiving the data, which belong to different PLMNs, when a specific service (e.g., V2X service) is supported.

The following description will be given with the appreciation that UE X may be a UE which has subscribed to PLMN A and has data required for a service (e.g., sensor data). In this respect, UE X may be referred to as a potential TxUE or TxUE. Further, UE Y may be a UE which has subscribed to PLMN B and receives data from UE X. Likewise, UE Y may be referred to as a potential RxUE or RxUE.

Figure 16:
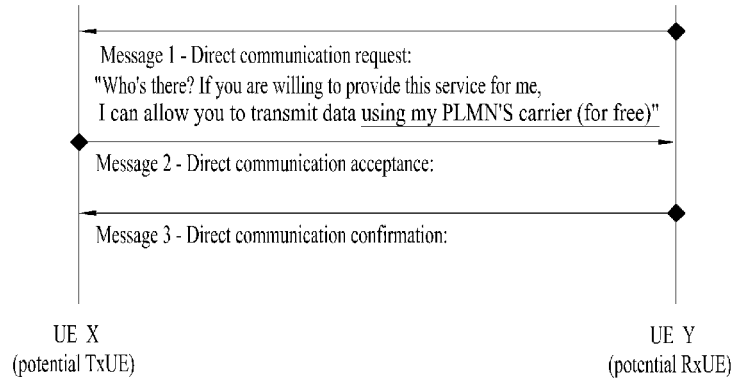
FIG. 16 is a diagram illustrating a signal flow for a method of configuring an inter-PLMN direct communication link between UEs according to an example or implementation example of the present disclosure.

A. Method of Obtaining Permission to Transmit Data and Use Resources in Carrier of Another PLMN According to an example or implementation example of the present disclosure, the TxUE may transmit data to the RxUE in a carrier (e.g., resource pool) of the PLMN to which the RxUE belongs. With reference to FIG. 16, a method of configuring an inter-PLMN direct communication link between a TxUE and an RxUE will first be described. As illustrated in FIG. 16, the method of configuring an inter-PLMN direct communication link may be performed in three steps.

Similarly to discovery model B, it is proposed that a UE to receive a specific service (e.g., a potential RxUE, UE Y in FIG. 16) triggers a unicast service request and direct communication link setup in the method of configuring an inter-PLMN direct communication link according to an example or implementation example of the present disclosure. It may be reasonable to charge the RxUE requesting the service (i.e., service beneficiary) for the service. The charging will be described later in detail with reference to FIG. 17.

Referring to FIG. 16, a method of obtaining a permission to use resources for data transmission to an RxUE in a carrier of PLMN B by a TxUE belonging to PLMN A will be described. In other words, the RxUE may allow the TxUE to transmit data in the carrier (e.g., resource pool) of the PLMN to which the RxUE has subscribed. Specifically, the method may be performed based on negotiations between the TxUE and the RxUE, including exchange of message 1 to message 3 illustrated in FIG. 16.

A-1 Message 1

The RxUE may transmit message 1 for the following purpose. That is, the RxUE may transmit message 1 to configure a direct communication link with a TxUE capable of transmitting data that the RxUE intends to receive for a specific service, while satisfying specific quality of service (QoS). The specific QoS may be QoS required by the RxUE. In the presence of any TxUE satisfying the above-described condition, message 1 may include i) information indicating that even though the TxUE has subscribed to a different PLMN from the PLMN of the RxUE, the TxUE may transmit data in a carrier of the PLMN of the RxUE, and ii) information indicating that the TxUE is not charged for the data transmission.

The RxUE may unicast, multicast, or broadcast message 1. Message 1 may be configured to include all or part of the following information. The information is described in detail in "C. Details of Message 1 to Message 3".

i) Information about a service to be received, ii) an indicator indicating that the TxUE is allowed to transmit data in a carrier of another PLMN (the PLMN to which the RxUE has subscribed), iii) an indicator indicating that the TxUE is not charged for the data transmission in the carrier of the PLMN of the RxUE, iv) QoS information about the service to be received, v) an SL transmission and reception capability of the RxUE, vi) an initial ID of the RxUE, and vii) a maximum waiting time for direct connection configuration.

Besides the above-described information, UE information, information about an on-going SL service, and RxUE subscriber information may be additionally included in message 1.

In FIG. 16, the potential RxUE (or UE Y) may transmit message 1 in i) a carrier of the PLMN (e.g., PLMN B) to which the RxUE has subscribed, ii) a carrier of another PLMN (e.g., PLMN A), or iii) common resources allocated/signaled for transmission of message 1. Each of the cases will be described below in detail.

i) In the case where the RxUE transmits message 1 in the carrier of PLMN B to which the RxUE has subscribed, only UEs intentionally receiving the carrier of PLMN B are highly likely to receive message 1, among UEs which have not subscribed to PLMN B. For a specific service requiring (or having a high probability of requiring) an inter-PLMN operation (e.g., a service for which a required QoS level may be satisfied only on the assumption of an inter-PLMN operation), UEs likely to transmit data related to the service (e.g., UE X of PLMN A) may be preconfigured to periodically (or aperiodically) receive (all or) a part of carriers of PLMN B available for transmission of message 1. In this manner, UE X of PLMN A may receive message 1 from a UE subscribed to a different PLMN (e.g., UE Y of PLMN B).

In relation to an operation of receiving a transmission carrier (e.g., transmission pool) of a different PLMN by a UE subscribed to a specific PLMN, whether to receive the transmission carrier of the different PLMN and the reception timing of the transmission carrier may be predetermined between the PLMNs through coordination. That is, the PLMNs may exchange, transmit, or negotiate system information required for transmission and reception of message 1. The system information may include, for example, i) information about a timing at which an event of transmitting message 1 is likely to occur, ii) information about a potential carrier or resource pool available for transmission of message 1, and/or iii) a radio configuration for message 1.

ii) When UE Y subscribed to PLMN B is to attempt to transmit message 1 in a carrier of another PLMN (e.g., PLMN A), UE Y should obtain a "permission to transmit message 1 in a carrier of PLMN A" from the other PLMN. The "permission to transmit message 1 in a carrier of PLMN A" may be pre-agreed based on coordination between the PLMNs or temporarily obtained according to a condition such as a specific service, event, and/or road environment.

The carrier (or resource pool) that PLMN A permits the UE (e.g., UE Y) subscribed to PLMN B to use for transmission may be a carrier (or resource pool) used commonly with subscribers of PLMN B. Alternatively, the carrier permitted for transmission may be a carrier (or resource pool) allocated for transmission of message 1 from subscribers of other PLMNs, independently of a carrier (or resource pool) used for data transmission from subscribers of PLMN B.

iii) In another method, message 1 may be transmitted in a carrier of an unlicensed band and/or a carrier shared among operators for an inter-PLMN operation. That is, message 1 may be transmitted in common transmission resources for all (or multiple) V2X UEs or resources that all (or multiple) V2X UEs are capable of receiving all the time (or with a very high probability), instead of resources owned by the operators of UEs participating in PC5 direct communication.

Whether to receive the common carrier (or resource pool) and a reception timing of the common carrier may be predetermined through coordination between the PLMNs. That is, the PLMNs may exchange, transmit, or negotiate system information required for transmission and reception of message 1. The system information may include, for example, i) information about a timing at which an event of transmitting message 1 is likely to occur, ii) information about a potential carrier or resource pool available for transmission of message 1, and/or iii) a radio configuration for message 1.

Because the TxUE and the RxUE are placed in different PLMN environments, the potential TxUE should be synchronized with the RxUE to successfully receive message 1 from the RxUE. According to an example or implementation example of the present disclosure, i) information about synchronization within a preset resource pool may be pre-agreed between the TxUE and the RxUE, ii) UEs receiving a specific service may be synchronized through grouping, or iii) else, the TxUE and the RxUE may be pre-synchronized with each other by using a global navigation satellite system (GNSS) or the like.

A-2 Message 2

Referring to FIG. 16, upon receipt of message 1, at least one TxUE may indicate direct communication acceptance to the potential RxUE (or UE Y) in response to message 1, when the following conditions i) to iii) are satisfied. If at least one (or any) of the conditions i) to iii) is not satisfied, the potential TxUE may transmit a message indicating service denial to the potential RxUE (or UE Y):

i) if the potential host UE can offer at least one of the requested services; and/or ii) if the potential host UE can support the requested type of direct connection; and/or iii) if the potential host UE can support the requested QoS for the services supported by the potential host UE.

All or part of the following information may be transmitted in message 2 to the RxUE (or UE Y). The information is described in detail in "C. Details of Message 1 to Message 3".

i) An accepted service ID/code, ii) traffic flow information, iii) information about service QoS that the TxUE may provide, iv) information about a radio resource configuration of the TxUE, v) information about the SL transmission/reception capability of the TxUE, vi) an initial ID of the TxUE (or UE X), and vii) information about the PLMN of the TxUE.

A-3 Message 3

The potential RxUE (or UE Y) may transmit message 3 to the at least one potential TxUE (or UE X) in response to message 2. Message 3 may include i) information indicating that a direct communication link has been configured (i.e., direct communication setup) and ii) information indicating that UE X is allowed to transmit data in the carrier of the PLMN of the potential RxUE. Specifically, UE Y may transmit a confirm message in message 3 to the TxUE that satisfies the following conditions i) and ii), in response to message 2:

i) if the accepted services are sufficient/acceptable for UE Y to establish the direct connection with UE X; and ii) if the expected QoS for the accepted services are sufficient/acceptable for UE Y to establish the direct connection with UE X connection with UE X.

UE Y may indicate direct communication reject in message to a TxUE that does not satisfy the above conditions. Message 3 indicating direct communication confirm may be configured to include all or part of the following information:

i) confirmed service information: a list of services that the remote UE wants over the direct connection being established;

ii) the ID of UE X to which the direct communication confirm message is destined; and iii) transaction ID: this uniquely identifies the message contents. If the message is retransmitted to achieve a diversity gain due to less-robust nature of D2D networks, the transaction ID is the same. For the same direct connection setup procedure, the transaction ID is the same.

Although the above-described "method of obtaining permission to transmit data and use resources in carrier of another PLMN" is performed in three steps, a modified procedure based on this method may also be considered. The modified procedure will be described below.

According to another example or implementation example of the present disclosure, it may be considered that the TxUE (or UE X) immediately transmits data to the Rx UE (or UE Y) based on a radio resource configuration indicated by message 1 after message 1 (direct communication request) and message 2 (direct communication acceptance), while message 3 (direct communication acceptance) is omitted.

According to another example or implementation example of the present disclosure, it may be considered that the TxUE (or UE X) immediately transmits data to the Rx UE (or UE Y) based on the radio resource configuration indicated by message 1 after message 1 (direct communication request), while message 2 and message 3 are omitted.

The inter-PLMN operation according to an example or implementation example of the present disclosure may be applied to a non-public safety (non-PS)-related service (e.g., a commercial service).

B. Method of Charging for Data Transmission in Carrier of Anther PLMN

Charging for communication over a PC5 interface may be performed by the charging mechanism of legacy proximity service (ProSe) direct communication. According to 3GPP TS 32.277, the following information is included in a usage information report.

i) UE identification information including an international mobile subscriber identity (IMSI); ii) a list of the locations of in-coverage UEs and corresponding timestamps; iii) configured radio parameters used for ProSe direct communication defined in TS 24.333; iv) a timestamp list for an in-coverage UF/out-of-coverage UE for the E-UTRAN; v) all ProSe direct communication groups identified by ProSe L2 Group IDs; vi) identification information (e.g., Source L2 IDs and IP addresses) about TxUEs in a one-to-many communication session; vii) a list of data of non-zero amounts transmitted by the UE; viii) a list of data of non-zero amounts received by the UE; and ix) application-specific data.

As described above with reference to FIGS. 15 and 16, when the RxUE conducts direct communication with the TxUE after transmitting "information indicating that the TxUE is allowed to transmit data in a carrier of another PLMN (e.g., the PLMN to which the RxUE has subscribed) "and/or "information indicating that the TxUE is not charged for the data transmission in the carrier of the PLMN to which the RxUE has subscribed", it is reasonable for the service beneficiary, RxUE (or UE Y) to pay for the service or communication. Accordingly, an example or implementation example of the present disclosure illustrated in FIG. 17 proposes the following charging mechanism.

Figure 17:
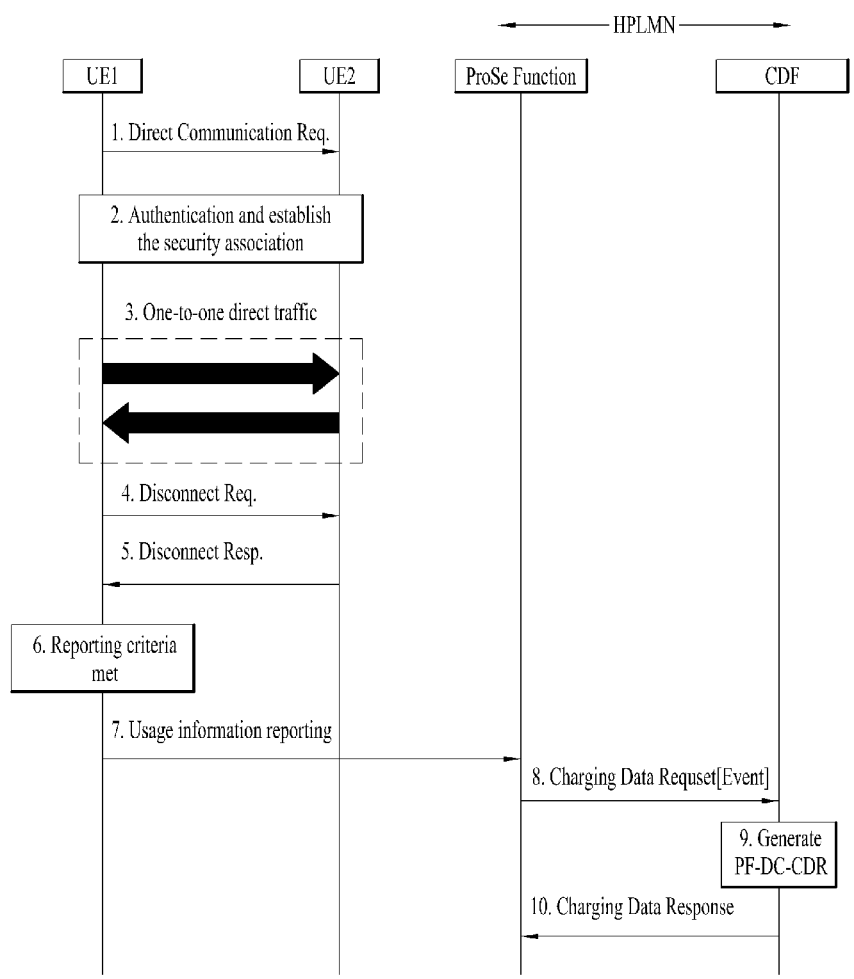
FIG. 17 is a diagram illustrating a signal flow for a charging mechanism for an inter-PLMN direct communication link between UEs according to an example or implementation example of the present disclosure.

In FIG. 17, UE 1 may be the potential RxUE (or UE Y) illustrated in FIGS. 15 and 16, and UE 2 may be the potential TxUE (or UE X) illustrated in FIGS. 15 and 16. Further, "Direct Communication Req.", "Authentication and establish the security association", and "One-to-one direct traffic" may correspond to the direct communication link configuration and the data transmission from the TxUE described with reference to FIGS. 15 and 16. When reporting criteria are met, UE 1 may report charging-related information to the network by a usage information report. Specifically, UE 1 may transmit the usage information report for the service received from UE 2 to a home PLMN (HPLMN) of UE 1. A ProSe function of the HPLMN i) generates a charging data request (CDR) or ii) reports a charging event for CDR generation of a charging data function (DCF), based on the usage information report from UE 1. The CDR or the charging event may be generated for Prose one-to-one direct communication for public safety (PF-DC-CDR).

According to another example or implementation example of the present disclosure, the TxUE which has subscribed to PLMN A but has transmitted data in resources of PLMN B upon request of the RxUE may also transmit an additional usage information report to PLMN B. The additional usage information report may include information about the amount of resources of PLMN B, which the TxUE has actually used to provide the service to the RxUE. The TxUE as well as the RxUE transmits the usage information report to PLMN B because the amount of resources predicted by the RxUE may be different from the amount of resources actually used by the TxUE.

Because the TxUE is not a subscriber of PLMN B, it is impossible for the TxUE to directly transmit the additional usage information report to PLMN B. Therefore, the TxUE may perform the following method i) or ii), for the additional usage information reporting.

i) The TxUE transmits the additional usage information report to the RxUE, and the RxUE transmits the received additional usage information report to PLMN B. In this case, the TxUE may transmit its PLMN list together with the additional usage information report to the RxUE. Accordingly, PLMN A and PLMN B may mutually check information such as authorization of PC5 communication for the TxUE.

ii) The TxUE may report the amount of resources of PLMN B that the TxUE has used to provide the service to the RxUE in the additional usage information report to the service provider to which the TxUE has subscribed, PLMN A. The TxUE may report an indicator indicating "use of resources of PLMN B based on a free-of-charge permission from the RxUE" in the usage information report to PLMN A. PLMN A may exchange and transmit information about charging for data transmission between UE X and UE Y with and to PLMN B based on the additional usage information report.

When PLMN B receives the usage information reports from both its subscriber, the RxUE and a subscriber of another PLMN, the TxUE, a method of charging the RxUE (e.g., averaging, min/max, or the like) may be an implementation issue.

C. Details of Message 1 to Message 3

C-1. Details of Information Included in Message 1

1. Radio resource configuration for SL 1.1. This information represents radio resource parameters used to establish a direct communication link.

1.2. This information element (IE) may include the following.

1.2.1. Initial ID of host UE 1.2.1.1. This ID may be a higher-layer ID of the host UE. This ID may be used by a higher layer of a remote UE to address the host UE.

1.2.1.2. This ID may be an L2 ID of the host UE. If this L2 ID is indicated, the potential remote UE needs to use the L2 ID to address the host UE by including the L2 ID in the L2 header of a message destined for the host UE. If this L2 ID is not indicated, the potential remote UE needs to use the L2 ID included in the L2 header of this direct communication request message.

1.2.2. SL resource pool structure 1.2.2.1. This represents the following information.

1.2.2.1.1. Control channel structure: time-frequency resources including a physical SL control channel 1.2.2.1.2. Data channel Structure: time-frequency resources including a physical SL data channel 1.2.2.2. A plurality of resource pools may be indicated.

1.2.2.3. For each resource pool, related service/traffic flow ID(s) may be indicated. Alternatively, for each service/traffic flow ID, related resource pool(s) may be indicated.

1.2.2.3.1 Resource pool-to-service/traffic flow ID mapping means frequency (channel)-to-service mapping.

1.2.3. Scheduling mode
1.2.3.1. This represents a method of selecting transmission resources to be used by the remote UE.
 1.2.3.1.1. Network-scheduled resource selection
  1.2.3.1.1.1. This may be configured only when the remote UE has indicated that it is located within network coverage.
 1.2.3.1.2. Host UE-scheduled resource selection
 1.2.3.1.3. Remote UE autonomous resource selection
1.2.3.2. This configuration may be made for each UE. Alternatively, this configuration may be provided for each service/traffic flow, so that a service/traffic flow with a stricter QoS requirement may be processed differently through strict control.
1.2.4. Synchronization configuration
1.2.4.1. This represents a synchronization reference source used to establish direct communication.
1.2.4.2. Information indicating that the GNSS is a priority synchronization reference; or
1.2.4.3. Information indicating that UE-transmitted synchronization (e.g., SLSS) is a priority synchronization reference; or
1.2.4.4. Information indicating that a DL synchronization signal is a priority synchronization reference; or
1.2.4.5. Information indicating the priorities of the DL synchronization signal, the GNSS, and the UE transmission synchronization signal as a synchronization reference; or
1.2.4.6. Information indicating that the host UE is a synchronization reference; or
 1.2.4.6.1. Synchronization signal identification information, for example, an SLSS ID that the host UE will use for SLSS transmission
1.2.4.7. Information indicating that the remote UE is a synchronization reference
 1.2.4.7.1. Synchronization signal identification information, for example, an SLSS ID that the remote UE will use for SLSS transmission
1.2.4.8. Information indicating that a distributed synchronization reference is used
 1.2.4.8.1. If this is indicated, FFS (For Further Study)
1.2.4.9. If this information is not provided, the UE continues to use a current synchronization method.
1.3. HARQ configuration
1.3.1. This configuration may be made for each UE. Alternatively, this configuration may be provided for each service or traffic flow, so that a service or traffic flow with a stricter QoS requirement may be processed through stricter control.
1.3.2. Feedback configuration
 1.3.2.1. HARQ feedback signaling method used for direct communication
 1.3.2.2. This information may need to be indicated for each communication direction (from the remote UE or to the remote UE) according to the direction of the established direct communication as well as the HARQ capabilities of the remote UE and the host UE.
 1.3.2.3. This information may need to be indicated for each communication direction, depending on an allowed service or traffic flow.
1.3.3. HARQ process number
 1.3.3.1. HARQ process number used by the remote UE
 1.3.3.2. HARQ process number used by the host UE
1.3.4. Retransmission number
1.4. Transmission power control configuration
1.4.1. This configuration may be made for each UE. Alternatively, this configuration may be provided for each service or traffic flow, so that a service or traffic flow with a stricter QoS requirement may be processed through stricter control.
1.4.2. Power control method (open loop power control or closed loop power control)
1.4.3. Power control parameters
 1.4.3.1. Basic transmission power P0: With Pi ignored, the remote UE needs to transmit with the transmission power P0.
 1.4.3.2. Step power adjustment level Pi
  1.4.3.2.1. The signaled Pi is a positive or negative single integer value; or
  1.4.3.2.2. The signaled Pi may be a value within a predetermined range.
  1.4.3.2.3. The remote UE needs to transmit with the transmission power P0+the accumulated value of the received Pi.
1.5. Further query
1.5.1. Additional compulsory information not identified by the direct connection request message
2. Requested QoS information
2.1. This information indicates a required/desired QoS level for the requested service.
2.2. This information may have to be indicated for each service level, when a plurality of services are requested.
2.3. This information may include the following QoS information.
2.3.1. A required QCI value, a 5QI, or a new QoS indicator value indicating a (sub)set of QoS parameters.
 2.3.1.1. Payload (bytes)
 2.3.1.2. Transmission rate (Message/Sec)
 2.3.1.3. Maximum end-to-end latency (ms)
 2.3.1.4. Target communication range
 2.3.1.5. Reliability (%)
 2.3.1.6. Data rate (Mbps)
  2.3.1.6.1. This may additionally indicate the following information.
  2.3.1.6.2. Average data rate: this represents a desired data rate when the channel is not congested.
  2.3.1.6.3. Minimum data rate: this represents a minimum data rate required to maintain the related service. If the service requests a guaranteed bit rate, this information is necessarily included.
  2.3.1.6.4. Aggregated maximum bit rate (AMBR): this represents a maximum data rate supported by the requested PC5 direct communication.
2.3.2. If the QCI, the 5QI, or the new QoS indicator may not represent all the parameters presented above, parameters not covered by the QoS indicator are indicated together with the QoS indicator.
2.3.3. Minimum required communication range (meters)
2.3.4. Need for QoS prediction
 2.3.4.1. This indicates whether the requested service requires a QoS prediction function. The QoS prediction function allows a served UE to know in advance a change of expected QoS (e.g., it is expected that a specific QoS level will drop within 10 seconds).
 2.3.4.2. This IE may additionally indicate a minimum timing advance by which a QoS change notification based on QoS prediction is notified to the remote UE before the moment the QoS is actually changed.
 2.3.4.3. This IE may further indicate the need to periodically update the QoS prediction notification to the remote UE.
  2.3.4.2.1. This IE may further indicate the periodicity of the required QoS prediction notification.

2.3.5. Need to support guaranteed QoS
2.3.5.1. This indicates whether the requested service requires guaranteed QoS.
2.3.5.1.1. The required QoS may be defined for a specific period. The specific period represents a minimum period during which promised QoS may be guaranteed. Regarding use of the IE, the IE further indicates a period during which the requested QoS needs to be maintained.
2.3.5.2. This IE may indicate a minimum probability with which the requested QoS needs to be satisfied.
3. Connection information
3.1. Type of direct connection
3.1.1. This IE may indicate one of "unicast", "multicast", or "broadcast". In the absence of this IE, "unicast" is basically indicated.
3.2. Direct communication direction
3.2.1. This IE may indicate "unidirectional reception only", "unidirectional transmission only" or "bidirectional".
3.3. Information about each requested service should be associated with one type of direct communication request. For this purpose, the connection information IE may have to be presented for each requested service ID.
4. Maximum waiting time for direct connection setup
4.1. This information indicates a maximum waiting time that the remote UE may wait until the requested direct communication is established, because the connection has been initially requested.
4.2. To enable the potential host UE to know when the connection was first requested, time information indicating the moment the direct communication request was first configured in the remote UE needs to be included in the direct communication request.
5. SL capability information
5.1. This represents the capabilities of remote UEs available for transmission and/or reception through the requested direct communication.
5.2. A transmission capability and a reception capability need to be indicated separately.
5.3. This information may indicate the following capability information for direct communication.
5.3.1. Information about supported modulation orders
5.3.2. Information about supported channel coding schemes
5.3.3. Information on supported RATs
5.3.4. Maximum transmission power supported by each supported RAT
5.3.5. Frequency band supported by each supported RAT
5.3.6. Bandwidth supported for each band supported for direct communication
5.3.7. Band combinations supported for direct communication
5.3.7.1. Band combination supported for simultaneous reception in direct communication
5.3.7.2. Band combination supported for simultaneous transmission in direct communication
5.3.8. Supported band combinations for simultaneous Uu and direct communication
5.3.8.1. Band combination supported for simultaneous reception
5.3.8.2. Band combination supported for simultaneous transmission
5.3.8.3. Supported band combination for simultaneous reception of Uu and transmission of direct communication
5.3.8.4. Supported band combination for simultaneous transmission of Uu and reception of direct communication
5.3.9. Duplex per RAT or per band per RAT
5.3.9.1. Half duplex
5.3.9.2. Full duplex
5.3.10. HARQ capability
5.3.10.1. This information indicates HARQ capability.
5.3.10.2. This information may further indicate the following information.
5.3.10.2.1. HARQ feedback support
5.3.10.2.2. Support of HARQ feedback signaling method
5.3.10.2.2.1. HARQ feedback through SL control channel
5.3.10.2.2.2. HARQ feedback through SL data channel (e.g., an HARQ feedback is piggybacked to a data transmission).
5.3.10.2.2.3. HARQ feedback through MAC control element (CE)
5.3.11. Maximum number of layers per frequency or per RAT (spatial multiplexing)
5.3.12. Supported synchronization sources
5.3.12.1. Support of GNSS as synchronization reference source
5.3.12.2. Support of UE-transmitted synchronization (e.g., SLSS) as synchronization reference source
5.3.12.3. Support of network synchronization (or DL synchronization) as synchronization reference source
5.4. This information may further indicate the security capabilities of the remote UE.
5.4.1. This information may indicate a supported encryption algorithm and related parameters.
5.4.2. This information may indicate a supported integrity check algorithm and related parameters.
5.5. This information may further indicate a supported security function.
5.5.1. Supported encryption algorithm
5.5.2. Supported integrity protection algorithm
5.5.3. Supported security key length
6. Initial ID of remote UE
6.1. This ID may be the L2 ID of the remote UE. If this L2 ID is indicated, the potential host UE needs to use this L2 ID to address the remote UE by including the L2 ID in the L2 header of a message destined for the remote UE. If this L2 ID is not indicated, the potential host UE needs to use the L2 ID included in the L2 header of this direct communication request message, or
6.2. This ID may be the higher-layer ID of the remote UE. This ID may be used for the higher layer of the receiving host UE to address the remote host UE.
7. UE state information
7.1. UE location
7.1.1. This information indicates the location of the remote UE.
7.1.1.1. This information may be used for the RxUE to determine whether the established direct connection may provide the requested QoS for the requested service.
7.1.1.2. This information may be used for initial power control by calculating the distance between the remote UE and the host UE.
7.1.1.3. This information may be used for initial beamforming.
7.2. Channel state information
7.2.1. This information represents channel statistics detected by the remote UE.
7.2.2. This information indicates a potential/unidentified interference source as well as channel use statistics used for direct communication.
7.2.3. Channel use statistics
7.2.3.1. Statistics may be measured energy levels.
7.2.3.2. More simply, the statistics may be channel busy ratio (CBR) measurements of detecting the channel as in use, when the measured energy levels of the corresponding resources are higher than a threshold value.

7.2.3.2.1. The threshold used to measure a CBR needs to be indicated.

7.2.3.3. This information may indicate the amount of used resources for each resource group in percentage (%).

7.2.3.3.1. The resource group may define a channel for a specific frequency range.

7.2.3.3.2. The resource group may be a group of resource blocks (RBs).

7.2.3.4. This information needs to be collected and signaled on a resource group basis. If the remote UE supports direct communication over multiple RATs, this IE needs to be signaled on an RAT basis.

7.2.3.5. If two or more frequencies are available for direct communication, this information needs to be collected and signaled on a carrier frequency basis.

7.2.3.6. This information needs to be collected and signaled on a resource pool basis for each RAT likely to be used for the requested direct communication.

7.3. Information about on-going SL service 7.3.1. This information may represent the properties of on-going SL service(s) and/or a service for which the remote UE has transmitted or is willing to transmit packets on SL. The host UE may use this information to better predict the reception opportunity of the remote UE, taking into account a half-duplex constraint and thus to better select transmission resources.

7.3.2. This information may indicate the properties of an on-going SL service and/or a service for which the remote UE has received or is willing to receive packets on SL. The host UE uses this information to consider, for example, the priorities of the on-going service of remote UEs and new services to be provided to the remote UE. This information may be useful in reducing potential collisions of reception resources at the remote UE, where a transmission from the host UE to the remote UE may collide with a transmission from another UE to the remote UE.

7.3.3. This information may be delivered as part of the channel state information.

7.3.4. This information may additionally indicate the required priority (e.g., packet priority per packet priority (PPPP)) of each on-going service.

7.3.5. This information may additionally indicate the required reliability (e.g., packet priority per packet reliability (PPPR)) of each on-going service.

7.3.6. This information may additionally indicate information about required QoS for the service.

7.3.6.1. This may indicate an average payload size, data rate, and/or maximum latency required for the on-going service.

7.3.6.2. This may indicate a required QCI value required for a continuous service.

7.3.6.3. This may indicate a required 5QI value required for the on-going service.

7.3.7. This information may additionally indicate the following information for each on-going service.

7.3.7.1. Average payload of messages transmitted and received for the service (bytes)

7.3.7.2. Average transmission rate (message/sec or transport blocks/sec) for the on-going service for which messages are transmitted.

7.3.7.3. Average message arrival rate. This indicates the arrival rate of messages from the higher layer in the on-going service for which messages are transmitted.

7.3.7.4. Average message arrival rate. This indicates the arrival rate of messages from a lower layer in the on-going service for which messages are received.

7.3.7.5. Average transmission delay (measured as the time interval between the arrival time of a message at a radio protocol stack and the actual transmission time of the message over the air (ms)).

7.3.7.6. Estimated transmission reliability (%)

7.3.7.6.1. This estimation may be performed by considering the statistics of received HARQ ACKs and/or HARQ NACKs.

7.3.7.6.1.1. The average reliability may be calculated by averaging over a moving fixed-size time window (the total number of received HARQ ACKs/the total number of transmitted TBs).

7.3.7.6.1.2. The average may be calculated by applying exponential weighted moving average (EWMA) over time. Here, $avg\_reliability\ (n)=(1-k)*avg\_reliability\ (n-1)+(k)*instantaneous\ reliability\ (n)$ where k may be a small value close to zero (e.g., 0.1), and the instantaneous reliability is measured by averaging the above-defined ratios.

7.3.7.6.2. This estimation may be performed by collecting statistics of a PDCP transmission buffer used for the service.

7.3.7.6.2.1. The average reliability may be measured by averaging ratios of the number of transmitted packets to the number of packets received from the higher layer.

7.3.7.7. Estimated reception reliability (%): this estimation may be performed in consideration of transmitted HARQ ACKs/NACKs.

7.3.7.7.1. The same averaging method defined above may be used to calculate a transmission reliability.

7.3.7.8. To inform the host UE of total traffic statistics for the service, it is sufficient to collect statistics on total frequencies in which packets of the service have been transmitted. Further, to collect the statistics, it is sufficient to collect statistics on total frequencies in which packets of all services have been transmitted. To enable the host UE to select a better resource configuration for the remote UE, the statistics need to be collected and indicated for each frequency/channel.

7.3.8. This information may further indicate the following information to help the host UE to avoid resources that are or may be used by the remote UE.

7.3.8.1. Information (time/frequency information) about transmission resources 7.3.8.1.1. This information may indicate resources reserved for holding or later-transmission of the on-going service.

7.3.8.1.1.1. This may indicate a pattern of resources to be used for the corresponding transmission.

7.3.8.1.1.2. This may indicate a) a time offset that may be used to identify the starting point of a reservation interval, b) a retransmission interval (the interval between an initial transmission and a retransmission), c) a reservation interval (a data transmission periodicity), and d) the ending time of reservation (the reservation is valid until the reservation ending time).

7.3.8.1.2. This information may indicate a set of resources dedicated to the on-going service.

7.3.8.1.3. Transmission resource information may be configured by collectively combining transmission resources related to a plurality of on-going services to reduce signaling overhead, rather than by signaling transmission resources for each service. This information may be interpreted as transmission resources prohibited by the host UE, when the remote UE is subject to half-duplex constraints.

7.3.8.2. Information about reception resources 7.3.8.2.1. This information may indicate resources (or a resource pool) available for reception of the on-going service.

7.3.8.2.1.1. This may indicate a pattern of resources to be used for the reception.

7.3.8.2.2. This information may indicate a set of resources dedicated to the on-going service.

7.3.8.2.3. The reception resource information may be configured by collectively combining reception resources related to a plurality of on-going services to reduce signaling overhead, rather than by signaling reception resources for each service. This information may be interpreted as transmission resources prohibited by the host UE, when the remote UE experiences a hidden node problem.

7.4. In-coverage/out-of-coverage information 7.4.1. This information indicates whether the remote UE is currently within the network or out of the area of the network.

7.4.2. When the remote UE supports multiple RATs, it is necessary to transmit the information on an RAT basis.

7.4.3. When the remote UE is configured with dual connectivity, this information may indicate a connection state with a primary cell.

7.4.4. This information is useful when the primary cell may control the connection so that the corresponding direct communication is requested.

7.5. Current synchronization source information 7.5.1. This information indicates whether the remote UE is capable of receiving a GNSS signal.

7.6. Transmission power used to transmit the direct communication request message.

7.6.1. This information may be used for the host UE to estimate pathloss between the remote UE and the host UE, and to determine and control the transmission power of the remote UE as well as the transmission power of the host UE.

8. UE subscriber information 8.1. Information about subscribed PLMN 8.1.1. This information indicates the home PLMN of the UE for cellular service including PC5.

8.1.2. This information may indicate PLMN(s) in which a PC5 operation is accepted for the UE.

8.1.3. This information may indicate a PLMN in which a PC5 operation for the requested service is accepted for the UE. This information needs to be signaled on a service basis.

8.1.4. This information may further indicate the following information.

8.1.4.1. Home PLMN for each RAT; this is a case in which the UE supports multiple RATs and each RAT is associated with the same or different home PLMNs (e.g., DSDA).

8.1.4.2. RATs supported for each allowed PLMN 8.1.4.3. Allowed behavior 8.1.4.3.1. This indicates which of the following operations are allowed for the PLMN.

8.1.4.3.2. Transmission only 8.1.4.3.3. Reception only 8.1.4.3.4. Both

C-2. Details of Information Included in Message 2

1. Accepted service ID/code 1.1. If the remote UE has requested one service ID/code, this ID/code need not be included.

2. Causes of service rejection 2.1. For a service that is not allowed, the cause of service rejection may be indicated.

2.1.1. The cause of rejection may be (request from unauthorized UE, request from banned UE, or lack of ability to provide requested QoS).

2.1.1.1. 'Lack of ability to provide requested QoS' may additionally indicate (lack of transmission resources, lack of reception resources, or both).

3. Traffic flow information 3.1. For allowed service(s), a related traffic flow ID may be indicated.

3.2. Rules of configuring traffic flow IDs:

3.2.1. Alt 1) A traffic flow ID is uniquely allocated to each traffic flow which is for either a "unidirectional" service or a "bidirectional service".

3.2.2. Alt 2) A traffic flow ID is uniquely allocated to traffic flows of the same direction. Accordingly, for the traffic flow ID of each traffic flow which is for either a "unidirectional" service or a "bidirectional" service for both directions, information that uniquely identifies the communication direction (forward (from the host UE to the remote UE) or reverse (from the remote UE to the host UE)) of the traffic flow is required.

3.2.3. The traffic flow ID may be different according to the direction of direct communication in the "bidirectional" service.

3.3. The traffic flow ID may be different according to the direction of direct communication in the "bidirectional" service.

4. Provided QoS information 4.1. Predicted QoS 4.1.1. This information indicates a predicted QoS level for an accepted service.

4.1.2. This information needs to be indicated for each accepted service (ID).

4.1.3. This information may be indicated for each QoS parameter requested by the remote UE during approval of the requested service.

4.2. Support of guaranteed QoS 4.2.1. This indicates whether the provided QoS may be guaranteed.

4.2.1.1. Requested QoS may be defined for a specific period. The specific period is a minimum time period during which promised QoS may be guaranteed. Regarding use of the IE, the IE further indicates a time period during which the provided QoS may be maintained.

4.2.2. This IE may be indicated together with a minimum probability of satisfying the provided QoS. The remote UE may determine based on this probability whether unicast link setup is proceeded/accepted at the QoS level provided by the host UE.

5. SL capability information 5.1. This information indicates the capability of the host UE in transmitting and/or receiving over a direct communication interface.

5.2. A transmission capability and a reception capability needs to be indicated separately.

5.3. The host UE includes the reception capability for "unidirectional for transmission only" or "bidirectional" as the direction of direct communication requested by the remote UE.

6. Radio resource configuration for SL 6.1. This information indicates radio resource parameters used to establish the direct communication link.

6.2. This IE may include the following.

6.2.1. Initial ID of host UE 6.2.1.1. This ID may be the higher-layer ID of the host UE. This ID may be used by the higher layer of the remote UE to address the host UE.

6.2.1.2. This ID may be the L2 ID of the host UE. If this L2 ID is indicated, the potential remote UE needs to use this L2 ID to address the host UE by including the L2 ID in the L2 header of a message destined for the host UE. If this L2 ID is not indicated, the potential remote UE needs to use the L2 ID contained in the L2 header of this direct communication request message.

6.2.2. SL resource pool structure 6.2.2.1. This represents the following information.

6.2.2.1.1. Control channel structure: time-frequency resources including a physical SL control channel 6.2.2.1.2. Data channel structure: time-frequency resource including a physical SL data channel 6.2.2.2. A plurality of resource pools may be indicated.

6.2.2.3. For each resource pool, related service/traffic flow ID(s) may be indicated. Alternatively, for each service/traffic flow ID, related resource pool(s) may be indicated.

6.2.2.3.1. Resource pool-to-service/traffic flow ID mapping means frequency (channel)-to-service mapping.

6.2.3. Scheduling mode 6.2.3.1. This represents a transmission resource selection method to be used by the remote UE.

6.2.3.1.1. Network-scheduled resource selection 6.2.3.1.1.1. This may be configured only when the remote UE has indicated that it is within network coverage.

6.2.3.1.2. Host UE-scheduled resource selection 6.2.3.1.3. Remote UE autonomous resource selection 6.2.3.2. This configuration may be made for each UE. Alternatively, this configuration may be provided for each service/traffic flow, so that a service/traffic flow with a stricter QoS requirement may be processed differently through strict control.

6.2.4. Synchronization configuration 6.2.4.1. This represents a synchronization reference source used to establish direct communication.

6.2.4.2. Information indicating that the GNSS is a priority synchronization reference; or 6.2.4.3. Information indicating that UE-transmitted synchronization (e.g., SLSS) is a priority synchronization reference; or 6.2.4.4. Information indicating that a DL synchronization signal is a priority synchronization reference; or 6.2.4.5. Information indicating the priorities of the DL synchronization signal, the GNSS, and the UE-transmitted synchronization signal as a synchronization reference; or 6.2.4.6. Information indicating that the host UE is a synchronization reference; or 6.2.4.6.1. Synchronization signal identification information, for example an SLSS ID that the host UE will use for SLSS transmission 6.2.4.7. Information indicating that the remote UE is a synchronization reference 6.2.4.7.1. Synchronization signal identification information, for example, an SLSS ID for the remote UE will use for SLSS transmission 6.2.4.8. Information indicating that distributed synchronization references are used 6.2.4.8.1. If this is indicated, FFS (For Further Study)

6.2.4.9. If this information is not provided, the UE continues to use a current synchronization method.

6.3. HARQ configuration 6.3.1. This configuration may be made for each UE. Alternatively, this configuration may be provided for each service/traffic flow, so that a service or traffic flow with a stricter QoS requirement may be processed through stricter control.

6.3.2. Feedback configuration 6.3.2.1. HARQ feedback signaling method used for direct communication 6.3.2.2. This information may need to be indicated for each communication direction (from the remote UE or to the remote UE) according to the direction of the established direct communication as well as the capabilities of the HARQ of the remote UE and the host UE.

6.3.2.3. This information may need to be indicated for each communication direction, depending on an allowed service or traffic flow.

6.3.3. HARQ process number 6.3.3.1. HARQ process number used by the remote UE 6.3.3.2. HARQ process number used by the host UE 6.3.4. Retransmission number 6.4. Transmission power control configuration 6.4.1. This configuration may be made for each UE. Alternatively, this configuration may be provided for each service/traffic flow, so that a service or traffic flow with a stricter QoS requirement may be processed through stricter control.

6.4.2. Power control method (open loop power control or closed loop power control)

6.4.3. Power control parameters 6.4.3.1. Basic transmission power P0: With Pi ignored, the remote UE needs to transmit with the transmission power P0.

6.4.3.2. Step power adjustment level Pi 6.4.3.2.1. The signaled Pi is a positive or negative single integer value; or 6.4.3.2.2. The signaled Pi may be a value within a predetermined range.

6.4.3.2.3. The remote UE needs to transmit with the transmission power P0+the accumulated value of the received Pi 6.5. Further query 6.5.1. Additional compulsory information not identified by the direct connection request message FIG. 18 is a block diagram illustrating wireless communication devices according to an example or implementation example of the present disclosure.

Figure 18:
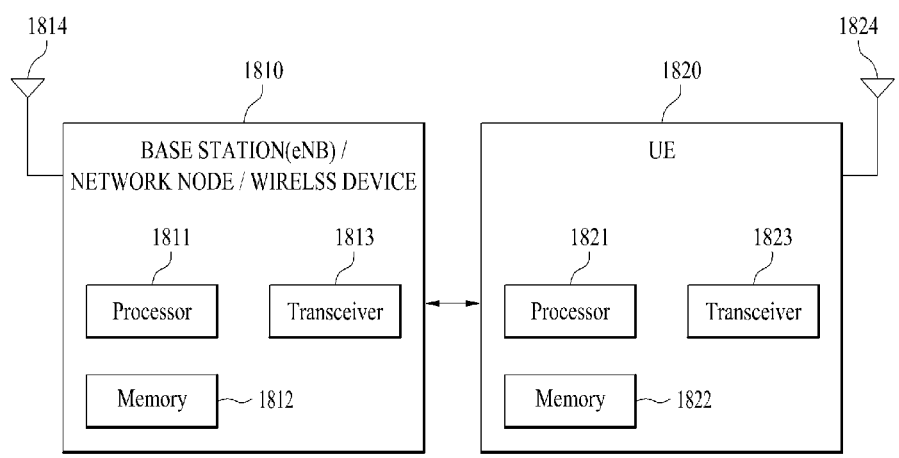
FIG. 18 is a block diagram illustrating wireless communication devices according to an example or implementation example of the present disclosure.

Referring to FIG. 18, the wireless communication system may include a BS 1810 and a UE 1820. The UE 1820 may be located within the coverage of the BS 1810. In some examples or implementation examples, the wireless communication system may include a plurality of UEs. While the BS 1810 and the UE 1820 are shown in FIG. 18, the present disclosure is not limited thereto. For example, the BS 1810 may be replaced with a network node, a UE, a wireless device, or the like. Alternatively, each of the BS and the UE may also be referred to as a wireless communication device or a wireless device.

The UE 1820 may include at least one processor 1821, at least one memory 1822, and at least one transceiver 1823. The processor 1811 may process requirements for each example or implementation example to implement the functions, procedures, or methods described in the foregoing examples or implementation examples. One or more protocols may be implemented by the processor 1821. For example, the processor 1821 may implement one or more layers (e.g., functional layers) of radio interface protocols. The memory 1822 is coupled to the processor 1821 and stores various types of information and/or instructions. The transceiver 1823 is electrically coupled to the processor 1821 and may transmit and/or receive a radio signal under the control of the processor 1821.

Specifically, the processor 1821 of a first UE as a data receiving UE in the wireless communication system may transmit a first message including an SL communication request and receive SL communication data from a second UE by controlling the transceiver 1823. The first UE may be a subscriber of a first PLMN, and the second UE may be a subscriber of a second PLMN different from the first PLMN. Further, the SL communication data may be received in a carrier of the first PLMN.

The first message may include i) information indicating that even a UE subscribed to a PLMN different from the first PLMN is allowed to transmit data in a carrier of the first PLMN, and ii) information indicating that the UE is not charged for the data transmission in the carrier of the first PLMN.

The first message may be transmitted in one of a carrier of the first PLMN, a carrier of the second PLMN, or a dedicated carrier for transmission of the first message.

The processor 1821 may receive a second message indicating the SL communication request has been accepted from the second UE through the transceiver in response to the first message, and transmit a third message indicating that an SL has been established to the second UE through the transceiver in response to the second message. The SL communication data may be received on the SL.

The SL communication data may be for a non-PS-related service.

The processor 1821 may report information related to use of resources for reception of the SL communication data to the first PLMN by controlling the transceiver.

In the wireless communication system, the processor 1821 of a second UE as a data transmitting UE may receive a first message including an SL communication request from a first UE and transmit SL communication data to the first UE by controlling the transceiver 1823. The first UE may be a subscriber of a first PLMN, and the second UE may be a subscriber of a second PLMN different from the first PLMN. Further, the SL communication data may be received in a carrier of the first PLMN.

When the first message is configured to be received in a carrier of the first PLMN, the UE may be preconfigured to periodically monitor the carrier of the first PLMN.

When the second UE satisfies a specific condition, the second UE may transmit the SL communication data. Further, the specific condition may be satisfied, when the second UE is capable of transmitting the SL communication data to the first UE, while satisfying specific QoS.

According to an example or implementation example of the present disclosure, direct communication may be efficiently conducted between UEs belonging to different PLMNs, and a charging mechanism may be defined clearly between the UEs.

The BS 1810 may include at least one processor 1811, at least one memory 1812, and at least one transceiver 1813. The processor 1811 may process requirements for each example or implementation example to implement the functions, procedures, or methods described in the foregoing examples or implementation examples.

One or more protocols may be implemented by the processor 1811. For example, the processor 1811 may implement one or more layers (e.g., functional layers) of radio interface protocols. The memory 1812 is coupled to the processor 1811 and stores various types of information and/or instructions. The transceiver 1813 is electrically coupled to the processor 1811 and may transmit and/or receive a radio signal under the control of the processor 1811.

The memory 1812 and/or the memory 1822 may be located inside or outside the processor 1811 and/or the processor 1821 and coupled to the processor by various technologies such as wired connection or wireless connection.

Specifically, the processor 1811 and/or the memory 1812 may be disposed in any suitable physical layout. According to an example or implementation example of the present disclosure, the processor 1811 and/or the memory 1812 may be implemented on the same board, the same package (e.g., system-in-package), and the same chip (e.g., system-on-chip). In an example or implementation example of the present disclosure, the processor 1811 and/or the memory 1812 may include distributed, virtualized, and/or containerized computing resources. In accordance with this example or implementation example, the processor 1811 and/or the memory 1812 may be located in one or more data centers and/or cloud computing facilities.

Further, in an example or implementation example of the present disclosure, the memory 1812 may include a non-transitory and tangible machine-readable medium including an executable code which, when executed by one or more processors, causes a computing device to perform the methods described in the disclosure, alone or in conjunction with another computing device in the environment. The BS 1810 and/or the UE 1820 may include a single antenna or multiple antennas. For example, an antenna 1814 and/or an antenna 1824 may be configured to transmit and receive radio signals.

Figure 19:
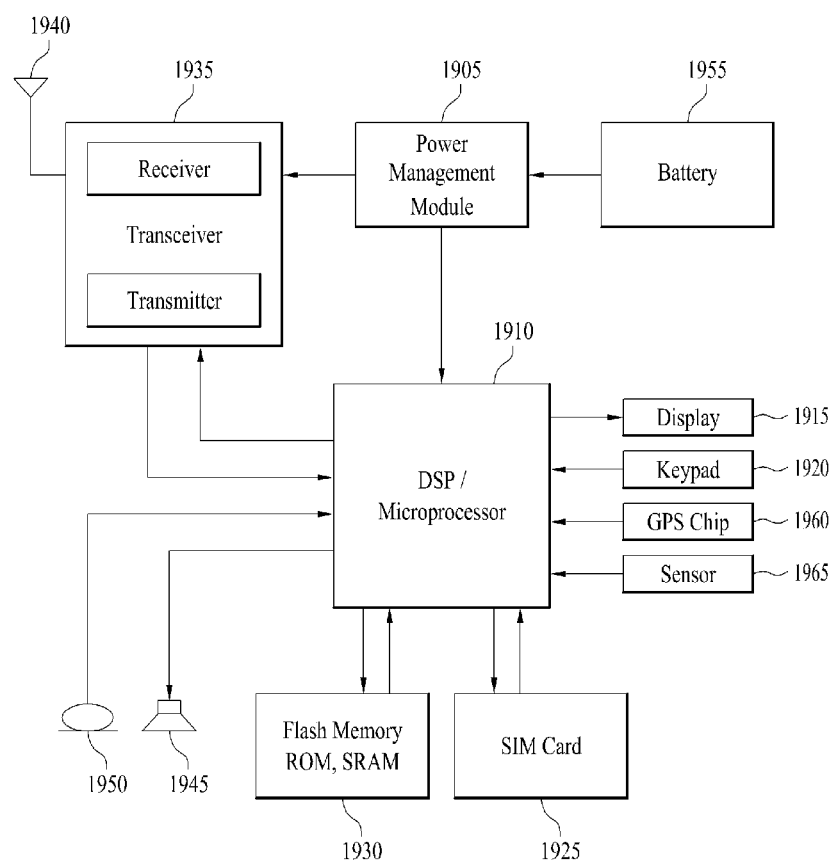
FIG. 19 is a block diagram illustrating a wireless communication device according to an example or implementation example of the present disclosure.

FIG. 19 is a simplified diagram illustrating a wireless communication device according to an example or implementation example of the present disclosure.

Referring to FIG. 19, the UE 1820 illustrated in FIG. 18 is described in detail. The wireless communication device of FIG. 19 may be a mobile computing device adapted to implement one or more of the above-described examples or implementation examples, not limited to the UE 1820. For example, the mobile computing device may include a vehicle communication system and/or device, a wearable device, a laptop computer, or a smart phone.

Further, referring to FIG. 19, the UE 1820 may include at least one of a processor 1910 including a digital signal processor (DSP) or a microprocessor, a transceiver 1935, a power management module 1905, an antenna 1940, and a battery 1955, a keypad 1920, a global positioning system (GPS) chip 1960, a sensor 1965, a memory 1930, a subscriber identification module (SIM) card 1925, a speaker 1945, or a microphone 1950. The UE 1820 may include a single antenna or multiple antennas.

The processor 1910 may process requirements for each foregoing example or implementation example of the present disclosure to implement the functions, procedures, or methods described in the example or implementation example. In some examples or implementations, the processor 1910 may implement one or more protocols such as layers (e.g., functional layers) of radio interface protocols.

The memory 1930 may be coupled to the processor 1910 and store information related to the operations of the processor 1910. The memory 1930 may be located inside or outside the processor 1910 and coupled to the processor 1910 by various technologies such as wired connection or wireless connection.

A user may input various types of information (e.g., indication information such as a telephone number) by various techniques such as pressing of a button on the keypad 20 or voice recognition or activation through the microphone 50. The processor 1910 may execute an appropriate function such as receiving and/or processing information of the user and dialing a telephone number. In some examples or implementation examples, data (e.g., operational data) may be loaded from the SIM card 1925 or the memory 930 to execute specific function(s). In some examples or implementation examples, the processor 1910 may receive and process GPS information from the GPS chip 1960 to detect the location of the UE or execute functions related to the location (vehicle navigation, map service, and so on). In some examples or implementation examples, the processor 1910 may display these various types of information and data on a display 1915, for reference and user convenience.

The transceiver 1935 may be coupled to the processor 1910 to transmit and/or receive wireless signals such as RF signals. The processor 1910 may control the transceiver 1935 to initiate communication and transmit wireless signals including various types of information or data, such as voice communication data. The transceiver 1935 may include a receiver for receiving a wireless signal and a transmitter for transmitting a wireless signal. The antenna 1940 facilitates the transmission and reception of wireless signals. In some examples or implementation examples, upon receipt of a wireless signal, the transceiver 1935 may forward and convert the signal to a baseband frequency for processing by the processor 1910. The processed signal may be processed by various techniques, such as being converted into audible or readable information, and output through the speaker 1945 and/or the display 1915.

In an example or implementation example, the sensor 1965 may be coupled to the processor 1910. The sensor 1965 may include one or more sensing devices configured to detect various types of information, including velocity, acceleration, light, vibration, proximity, location, image, and the like. The processor 1910 may receive and process sensor information obtained from the sensor 1965, thereby executing various functions such as collision avoidance and autonomous driving based on the processed sensor information.

Alternatively, various components (e.g., a camera, a universal serial bus (USB) port, and so on) may further be included in the UE. For example, a camera may further be coupled to the processor 1910, for use in various services including autonomous driving and vehicle safety services. FIG. 19 merely illustrates one example or implementation example of a UE, not limiting the scope of the present disclosure. For example, some components, such as the keypad 1920, the GPS chip 1960, the sensor 1965, the speaker 1945, and/or the microphone 1950 may be excluded from or may not be implemented in the UE in some examples or implementation examples.

Figure 20:
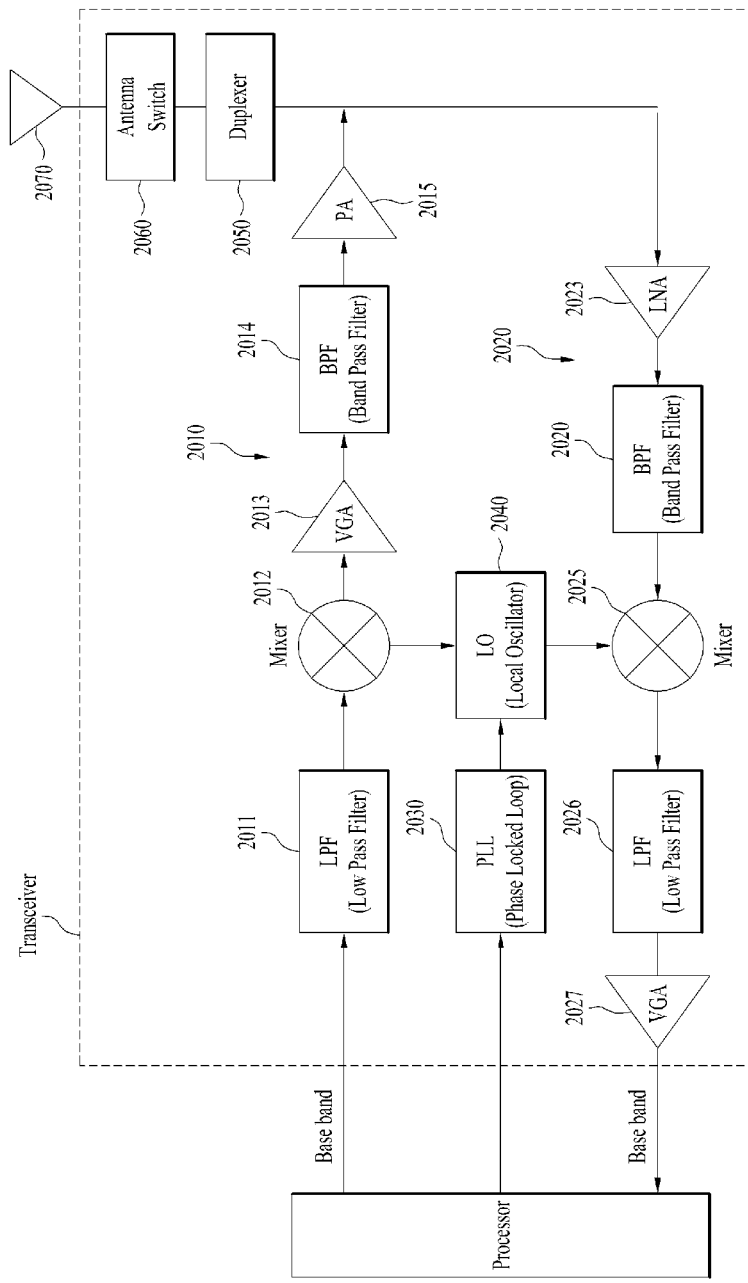
FIG. 20 is a simplified block diagram illustrating a transceiver in a wireless communication device according to an example or implementation example of the present disclosure.

FIG. 20 is a simplified block diagram illustrating a transceiver in a wireless communication device according to an example or implementation example of the present disclosure.

Specifically, the transceiver illustrated in FIG. 20 may be an exemplary transceiver which may be implemented in an FDD system.

In a transmission path, at least one processor such as the processor described with reference to FIGS. 18 and 19 may process data to be transmitted and provide a signal such as an analog output signal to a transmitter 2010.

The transmitter 2010 may filter the analog output signal by a low pass filter (LPF) 2011 (e.g., to cancel artifacts caused by conventional digital-to-analog conversion (ADC)), upconvert the filtered baseband signal to an RF signal by an upconverter (e.g., mixer) 2012, and amplify the RF signal by a variable gain amplifier (VGA) 2013. The amplified signal may be filtered by a filter 2014, further amplified by a power amplifier (PA) 2015, routed through a duplexer 2050/antenna switch 2060, and then transmitted through an antenna 2070.

In a reception path, the antenna 2070 may receive a signal from a wireless environment. The received signal may be routed through the antenna switch 2060/duplexer 2050 and provided to a receiver 2020.

For example, a signal received at the receiver 2020 is amplified by an amplifier including a low noise amplifier (LNA) 2023, filtered by a band pass filter (BPF) 2024, and downconverted from an RF band to a baseband by a downconverter 2025, for example, a mixer.

The downconverted signal is filtered by an LPF 2026 and amplified by an amplifier including a VGA 2027 to obtain an analog input signal, which is provided to the processor described with reference to FIGS. 18 and 19.

Further, a local oscillator (LO) 2040 generates a transmission LO signal and a received LO signal and provides the transmission LO signal and the received LO signal to the upconverter 2012 and the downconverter 2025, respectively.

The present disclosure is not limited to the configuration illustrated in FIG. 20, and various components and circuits may be arranged differently from the example illustrated in FIG. 20, for functions and effects according to examples or implementation examples of the present disclosure.

Figure 21:
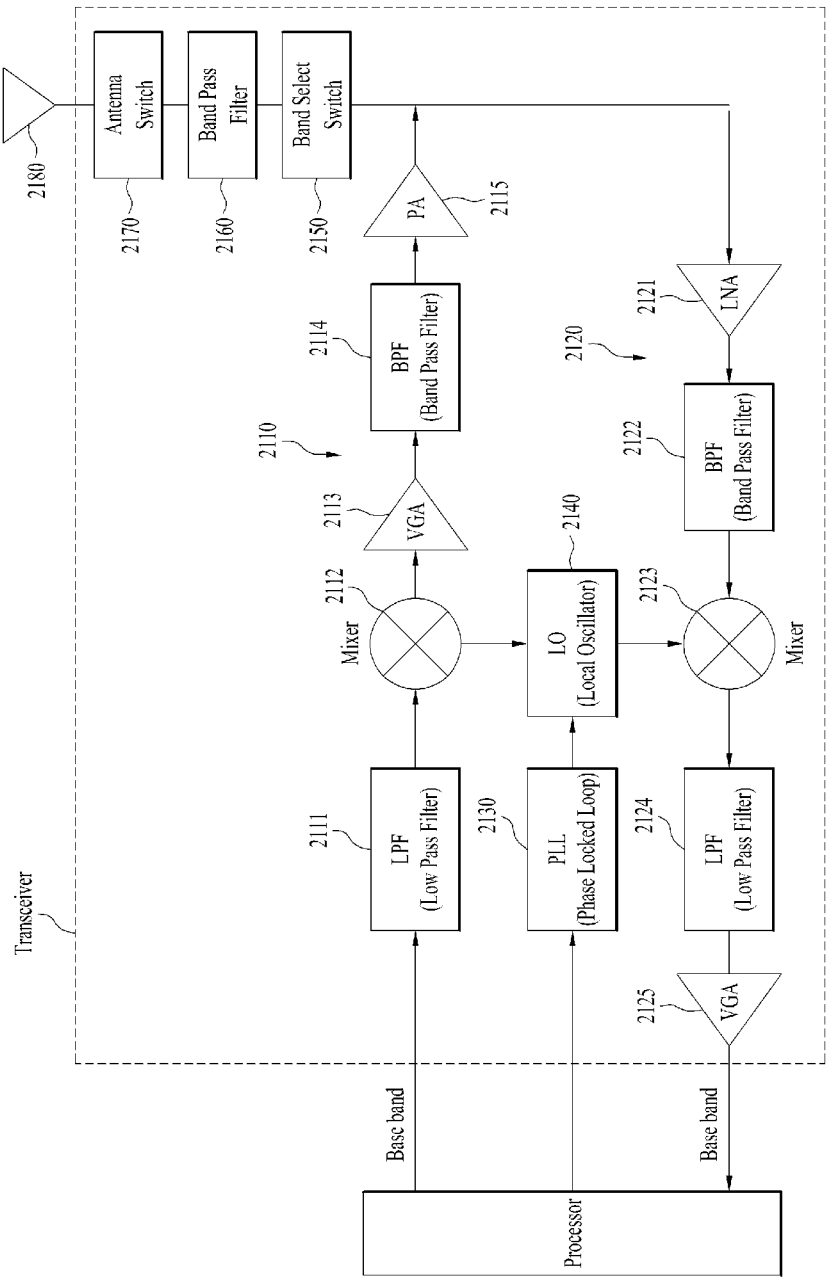
FIG. 21 is a simplified block diagram illustrating another exemplary transceiver in a wireless communication system according to an example or implementation example of the present disclosure.

FIG. 21 is a block diagram illustrating another exemplary transceiver in a wireless communication device according to an example or implementation example of the present disclosure.

Particularly, FIG. 21 illustrates an exemplary transceiver that may be implemented in a TDD system.

In some examples or implementation examples, a transmitter 2110 and a receiver 2120 included in the transceiver of the TDD system may have one or more features similar to those of the transmitter and receiver included in the transceiver of the FDD system. The structure of the transceiver of the TDD system will be described below.

In a transmission path, a signal amplified by a PA 2115 of the transmitter is routed through a band selection switch 2150, a BPF 2160, and an antenna switch 2170, and then transmitted through an antenna 2180.

In a reception path, the antenna 2180 receives a signal from a wireless environment. The received signal is routed through the antenna switch(s) 2170, the BPF 2160, and the band selection switch 2150 and provided to the receiver 2120.

Figure 22:
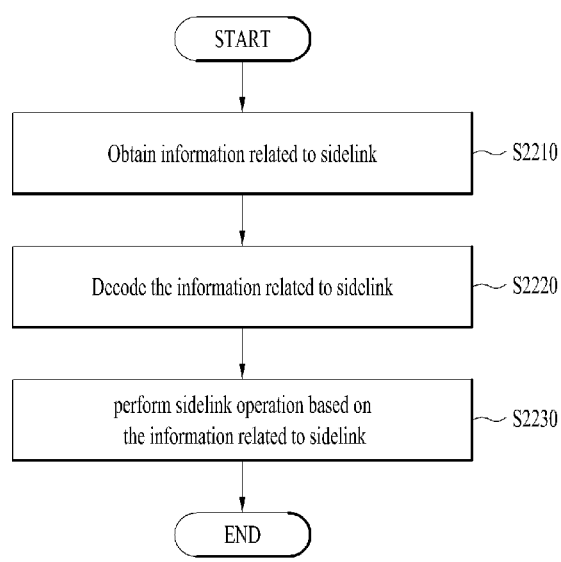
FIG. 22 is a flowchart illustrating a sidelink-related operation of a wireless device according to an example or implementation example of the present disclosure.

FIG. 22 is a flowchart illustrating an SL-related operation of a wireless device according to an example or implementation example of the present disclosure.

Referring to FIG. 22, the wireless device may acquire SL-related information (S2210). The SL-related information may be information about at least one resource configuration, and may be obtained from another wireless device or a network node.

After obtaining the SL-related information, the wireless device may decode the SL-related information (S2220).

After decoding the SL-related information, the wireless device performs one or more SL operations based on the SL-related information (S2230). The SL operation(s) performed by the wireless device may be one or more operations illustrated in the flowchart.

The SL-related operation of the wireless device in the flowchart illustrated in FIG. 22 is merely an example, and the wireless device may perform an SL operation using various techniques. An SL may be an interface between UEs for SL communication and/or SL discovery. The SL may correspond to a PC5 interface. An SL operation may be transmission and/or reception of information between UEs in a broad sense.

Figure 23:
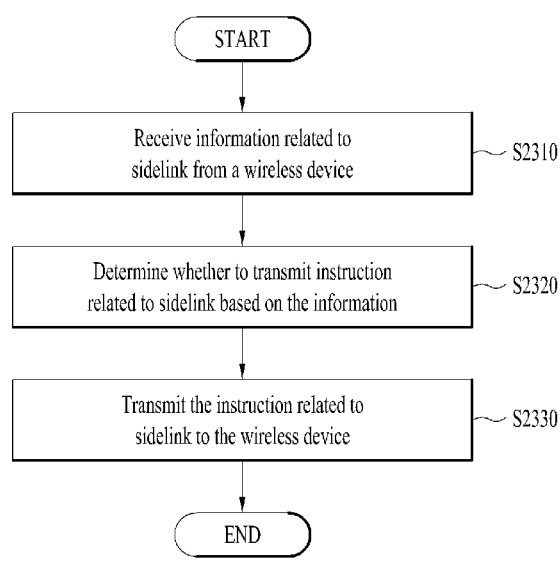
FIG. 23 is a flowchart illustrating a sidelink-related operation of a network node according to an example or implementation example of the present disclosure.

FIG. 23 is a flowchart illustrating an SL-related operation of a network node according to an example or implementation example of the present disclosure.

The SL-related operation of the network node illustrated in FIG. 23 is merely an example, and the network node may perform an SL operation using various techniques.

The network node may receive SL-related information from a wireless device (S2310). For example, the SL-related information may be 'SidelinkUEInformation' used to indicate SL information for a network node.

After receiving the SL-related information, the network node determines whether to transmit one or more SL-related instructions based on the received SL-related information (S2320).

When determining to transmit a command, the network node transmits an SL-related command to the wireless device based on the command determined to be transmitted (S2330). For example, the wireless device that has received the command from the network node may perform one or more SL operations based on the received command.

Figure 24:
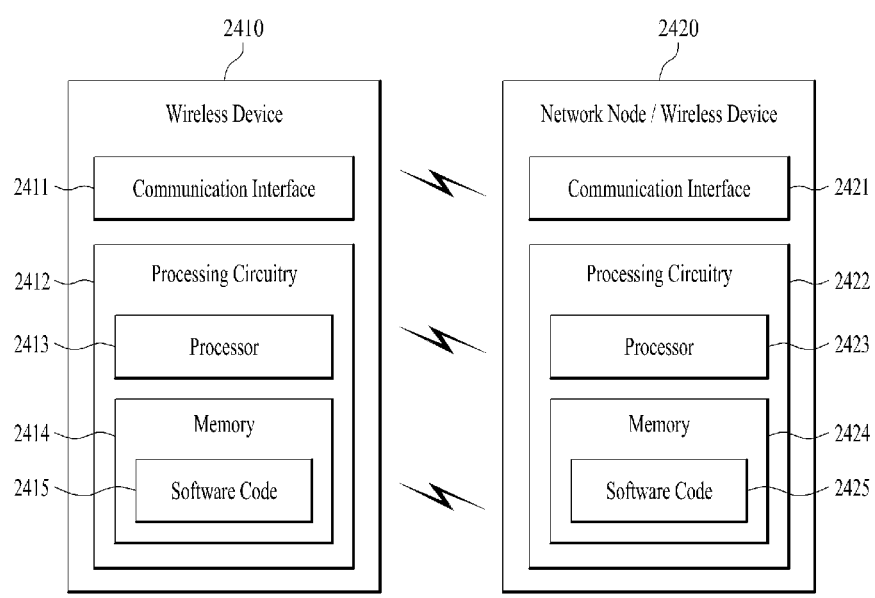
FIG. 24 is a block diagram illustrating a wireless device and a network node according to an example or implementation example of the present disclosure.

FIG. 24 is a simplified block diagram illustrating the configurations of a wireless device and a network node according to an example or implementation example of the present disclosure. A network node 2420 may be replaced by the wireless device or UE illustrated in FIG. 19.

For example, a wireless device 2410 may include a communication interface 2411 for communicating with one or more other wireless devices, network nodes, and/or other elements of a network. The communication interface 2411 may include one or more transmitters, one or more receivers, and/or one or more communication interfaces. Additionally, the wireless device 2410 may include a processing circuit 2412. The processing circuit 2412 may include at least one processor such as a processor 2413 and at least one memory device such as a memory 2414.

The processing circuit 2412 may control one or more of the afore-described methods and/or processes and cause the wireless device 2410 to perform those methods and/or processes. The processor 2413 may correspond to one or more processors for executing the functions of the wireless device described herein. The wireless device 2410 also includes the memory 2414 configured to store data, programmable software code, and/or other information described herein.

In one or more examples or implementation examples, the memory 2414 may be configured to store software code 2415 including instructions that cause at least one processor to perform some or all of the processes described with reference to FIG. 22 or the examples or implementation examples of the methods described above.

For example, at least one process related to transmission or reception of information may be performed by the processor 3113 that controls the transceiver 1823 of FIG. 18 to transmit or receive information.

The network node 2420 may include at least one communication interface 2421 for communicating with one or more other network nodes, wireless devices, and other elements of the network. The communication interface 2421 includes at least one transmitter, at least one receiver, and/or at least one communication interface. Further, the network node 2420 may include a processing circuit 2422. The processing circuit may include a processor 2423 and a memory 2424.

For example, at least one process related to transmission or reception of information may be performed by the processor 1811 that controls the transceiver 1813 illustrated in FIG. 18 to transmit or receive information.

Figure 25:
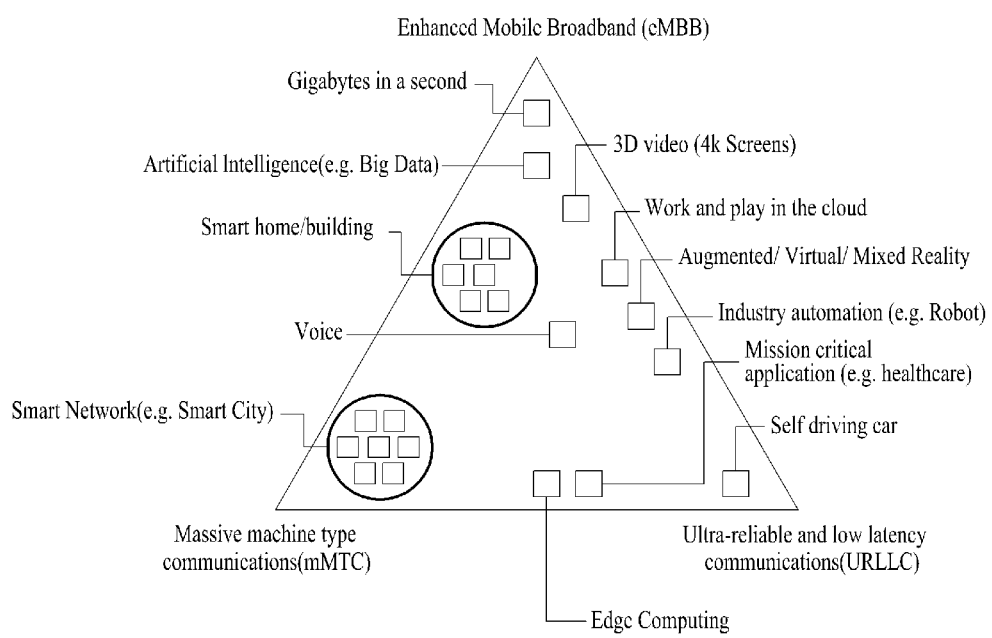
FIG. 25 is a diagram illustrating an example of $5^{th}$ generation (5G) use scenarios.

FIG. 25 illustrates exemplary 5G use scenarios.

Referring to FIG. 25, three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases included in the triangle illustrated in FIG. 25 will be described in greater detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

The examples or implementation examples of the present disclosure may be implemented through various means, for example, in hardware, firmware, software, or a combination thereof.

In a hardware configuration, the methods according to the examples or implementation examples of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the examples or implementation examples of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred examples or implementation examples of the present disclosure so that those skilled in the art may implement and perform the present disclosure. While reference has been made above to the preferred examples or implementation examples of the present disclosure, those skilled in the art will understand that various modifications and alterations may be made to the present disclosure within the scope of the present disclosure. For example, those skilled in the art may use the components described in the foregoing examples or implementation examples in combination. The above examples or implementation examples are therefore to be construed in all aspects as illustrative and not restrictive.

Those skilled in the art will appreciate that the present disclosure may be carried out in other specific ways than those set forth herein without departing from the spirit and essential characteristics of the present disclosure. The above examples or implementation examples are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an example or implementation example of the present disclosure or included as a new claim by a subsequent amendment after the application is filed.

INDUSTRIAL APPLICABILITY

While a method of detecting DCI and a UE therefor have been described above in the context of being applied to a 3GPP LTE system, the method and UE are also applicable to various wireless communication systems other than the 3GPP LTE system.

The invention claimed is:

1. A method of receiving data by a first user equipment (UE) in a wireless communication system, the method comprising:
    transmitting, to a second UE, a first message including a sidelink communication request;
    receiving, from the second UE, a second message related to that the sidelink communication request has been accepted in response to the first message; and
    receiving sidelink communication data from the second UE,
    wherein the sidelink communication data is for a non-public safety (PS)-related service,
    wherein a type of the sidelink communication data is unicast,
    wherein the first UE is a subscriber of a first public land mobile network (PLMN) and the second UE is a subscriber of a second PLMN different from the first PLMN,
    wherein the sidelink communication data is received in a carrier of the first PLMN,
    wherein the first message includes i) information on that even a UE subscribed to a PLMN other than the first PLMN is allowed to transmit data in a carrier of the first PLMN, and ii) information on that the UE is not charged for the data transmission in the carrier of the first PLMN, and iii) information on service code,
    wherein a layer-2 identifier (ID) of the first UE is transmitted with the first message, and
    wherein the data transmission from the second UE is charged to the first UE.

2. The method according to claim 1, wherein the first message is transmitted in one of a carrier of the first PLMN, a carrier of the second PLMN, or a dedicated carrier for transmission of the first message.

3. The method according to claim 1, further comprising reporting information related to use of reception resources of the sidelink communication data to the first PLMN.

4. The method according to claim 1, wherein the first UE implements at least one advanced driver assistance system (ADAS) function based on a signal controlling movement of the first UE.

5. A method of transmitting data by a second user equipment (UE) in a wireless communication system, the method comprising:
    receiving, from a first UE, a first message including a sidelink communication request;
    transmitting, to the first UE, a second message related to that the sidelink communication request has been accepted in response to the first message; and
    transmitting sidelink communication data to the first UE,
    wherein the sidelink communication data is for a non-public safety (PS)-related service,
    wherein a type of the sidelink communication data is unicast,
    wherein the first UE is a subscriber of a first public land mobile network (PLMN) and the second UE is a subscriber of a second PLMN different from the first PLMN,
    wherein the sidelink communication data is transmitted in a carrier of the first PLMN,
    wherein the first message includes i) information on that even a UE subscribed to a PLMN other than the first PLMN is allowed to transmit data in a carrier of the first PLMN, and ii) information on that the UE is not charged for the data transmission in the carrier of the first PLMN, and iii) information on service code,
    wherein a layer-2 identifier (ID) of the first UE is transmitted with the first message, and
    wherein the data transmission from the second UE is charged to the first UE.

6. The method according to claim 5, wherein when the first message is configured to be received in a carrier of the first PLMN, the second UE is preconfigured to periodically monitor the carrier of the first PLMN.

7. The method according to claim 5, wherein when a specific condition is satisfied, the second UE transmits the sidelink communication data, and
    wherein when the second UE is capable of transmitting the sidelink communication data to the first UE, while satisfying specific quality of service (QoS), the specific condition is satisfied.

8. The method according to claim 5, further comprising reporting information related to use of transmission resources of the sidelink communication data to the first PLMN.

9. A first user equipment (UE) for receiving data in a wireless communication system, the first UE comprising:
    a transceiver; and
    a processor configured to:
    transmit, to a second UE, a first message including a sidelink communication request by controlling the transceiver;
    receive, from the second UE, a second message related to that the sidelink communication request has been accepted in response to the first message by controlling the transceiver; and
    receive sidelink communication data from the second UE by controlling the transceiver,
    wherein the sidelink communication data is for a non-public safety (PS)-related service,
    wherein a type of the sidelink communication data is unicast,
    wherein the first UE is a subscriber of a first public land mobile network (PLMN) and the second UE is a subscriber of a second PLMN different from the first PLMN,
    wherein the sidelink communication data is received in a carrier of the first PLMN,
    wherein the first message includes i) information on that even a UE subscribed to a PLMN other than the first PLMN is allowed to transmit data in a carrier of the first PLMN, and ii) information on that the UE is not charged for the data transmission in the carrier of the first PLMN, and iii) information on service code,
    wherein a layer-2 identifier (ID) of the first UE is transmitted with the first message, and
    wherein the data transmission from the second UE is charged to the first UE.

10. The first UE according to claim 9, wherein the first message is transmitted in one of a carrier of the first PLMN, a carrier of the second PLMN, or a dedicated carrier for transmission of the first message.

11. The first UE according to claim 9, wherein the processor is configured to report information related to use of reception resources of the sidelink communication data to the first PLMN by controlling the transceiver.

12. A second user equipment (UE) for transmitting data in a wireless communication system, the second UE comprising:

a transceiver; and a processor configured to:

receive, from a first UE, a first message including a sidelink communication request from a first UE by controlling the transceiver, transmit, to the first UE, a second message related to that the sidelink communication request has been accepted in response to the first message by controlling the transceiver, and transmit sidelink communication data to the first UE by controlling the transceiver, wherein the sidelink communication data is for a non-public safety (PS)-related service, wherein a type of the sidelink communication data is unicast, wherein the first UE is a subscriber of a first public land mobile network (PLMN) and the second UE is a subscriber of a second PLMN different from the first PLMN, wherein the sidelink communication data is transmitted in a carrier of the first PLMN, wherein the first message includes i) information on that even a UE subscribed to a PLMN other than the first PLMN is allowed to transmit data in a carrier of the first PLMN, and ii) information on that the UE is not charged for the data transmission in the carrier of the first PLMN, and iii) information on service code, wherein a layer-2 identifier (ID) of the first UE is transmitted with the first message, and wherein the data transmission from the second UE is charged to the first UE.

13. The second UE according to claim 12, wherein when the first message is configured to be received in a carrier of the first PLMN, the second UE is preconfigured to periodically monitor the carrier of the first PLMN.

14. The second UE according to claim 12, wherein when a specific condition is satisfied, the second UE transmits the sidelink communication data, and wherein when the second UE is capable of transmitting the sidelink communication data to the first UE, while satisfying specific quality of service (QoS), the specific condition is satisfied.

15. The first UE according to claim 9, wherein the first UE is capable of communicating with at least one of another UE, a UE related to an autonomous driving vehicle, a base station or a network.

\* \* \* \* \*